(12) United States Patent
Livanos et al.

(10) Patent No.: US 10,834,266 B2
(45) Date of Patent: Nov. 10, 2020

(54) PROCESS-EFFICIENT GENERATION OF DATA RECORDS FOR DATA COMMUNICATIONS INVOLVING GROUPS OR AGGREGATES OF IOT DEVICES

(71) Applicant: Cisco Technology, Inc., San Jose, CA (US)

(72) Inventors: Konstantin Livanos, Naperville, IL (US); Swapna Anandan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/042,342

(22) Filed: Jul. 23, 2018

(65) Prior Publication Data

US 2020/0028973 A1 Jan. 23, 2020

(51) Int. Cl.
 *H04M 15/00* (2006.01)
 *H04L 12/26* (2006.01)
 *H04W 4/24* (2018.01)

(52) U.S. Cl.
 CPC ........ *H04M 15/765* (2013.01); *H04L 43/065* (2013.01); *H04M 15/43* (2013.01);
 (Continued)

(58) Field of Classification Search
 CPC .... H04M 15/765; H04M 15/43; H04M 15/58; H04M 15/8214; H04M 15/64;
 (Continued)

(56) References Cited

U.S. PATENT DOCUMENTS

2010/0188975 A1* 7/2010 Raleigh ............ G06Q 10/06375
 370/230.1
2013/0262308 A1* 10/2013 Cai ...................... G06Q 20/145
 705/44

(Continued)

OTHER PUBLICATIONS

3GPP Organizational Partners, "3rd Generation Partnership Project; Technical Specification Group Services and System Aspects; Architecture enhancements to facilitate communications with packet data networks and applications (Release 14)", 3GPP TS 23.682 V14.8.0, Jun. 2018, 108 pages.

(Continued)

*Primary Examiner* — Dinh Nguyen

(57) ABSTRACT

Methods, apparatus, and systems for the process-efficient generation of data records for data communications involving groups or aggregates of user equipment (UE), such as IoT devices, are described. In one illustrative example, for each one of a plurality of UEs associated with a group or aggregation identifier (ID), a request which includes data indicative of a network resource usage event of the UE is received and the data are stored in association with the group or aggregation ID. In response to identifying a predetermined condition, the data indicative of the network resource usage events associated with the group or aggregation ID are aggregated, and a request for generating a data record based on the aggregated data is sent to a data function for generating the data record. The generated data record (e.g. a CDR) may be stored for subsequent retrieval for reporting, analysis, network/communications management, or billing.

20 Claims, 15 Drawing Sheets

(52) U.S. Cl.
CPC ....... *H04M 15/58* (2013.01); *H04M 15/8214* (2013.01); *H04M 15/64* (2013.01); *H04M 15/65* (2013.01); *H04M 15/66* (2013.01); *H04W 4/24* (2013.01)

(58) Field of Classification Search
CPC ..... H04M 15/65; H04M 15/66; H04L 43/065; H04W 4/24
See application file for complete search history.

(56) References Cited

U.S. PATENT DOCUMENTS

| | | | |
|---|---|---|---|
| 2015/0373205 A1 | 12/2015 | Li et al. | |
| 2016/0105891 A1* | 4/2016 | Li | H04W 4/70 370/329 |
| 2016/0127210 A1* | 5/2016 | Noureddin | H04L 43/065 455/405 |
| 2016/0261998 A1* | 9/2016 | Sharma | H04W 4/70 |
| 2018/0324671 A1* | 11/2018 | Palnati | H04L 63/0876 |

OTHER PUBLICATIONS

3GPP Organizational Partners, "3rd Generation Partnership Project; Technical Specification Group Services and System Aspects; Policy and charging control architecture (Release 14)", 3GPP TS 23.203 V14.6.0, Jun. 2018, 257 pages.

"3rd Generation Partnership Project; Technical Specification Group Services and Systems Aspects; Telecommunication Management; Charging Management; Diameter Charging Applications (Release 9)"; 3GPP TS32.299 V9.8.0 (Jun. 2011), pp. 1-149.

"Universal Mobile Telecommunications Systems (UMTS); LTE' Digital Telecommunications System (Phase 2+) (GSM); Telecommunication Management; Control Plane (CP) Data Transfer Domain Charging (3GPP TS 32.253 version 14.0.0 Release 14)"; ETSI TS 132 253 V14.0.0 (Apr. 2017); pp. 1-31.

"Digitial Cellular Telecommunications System (Phase 2+) (GMS); Universal Mobile Telecommunications Systems (UMTS); LTE; Telecommunication Management; Charging Management; Charging Data Record (CDR) File Format and Transfer (3GPP TS 32.297 Version 14.0.0 Release 14)"; ETSI TS 297 V14.0.0 (Apr. 2017); pp. 1-31.

"Digital Cellular Telecommunication System (Phase 2+); Universal Mobile Telecommunications Systems (UMTS); LTE; Telecommunication Management; Charging Management; Diameter Charging Applications (3GPP TS 32.299 Version 12.6.0 Release 12)"; ETSI TS 132 299 V12.6.0 (Oct. 2014); pp. 1-166.

International Search Report and Written Opinion in counterpart International Application No. PCT/US2019/041908, dated Sep. 24, 2019, 18 pages.

3GPP, "3rd Generation Partnership Project; Technical Specification Group Services and System Aspects; Telecommunication management; Charging management; Diameter charging applications (Release 15)", 3GPP TS 32.299 V15.2.0, Mar. 2018, 200 pages.

Nokia et al., "Introduce CP Data transfer CDRs description", 3GPP TSG-SA5 Meeting #107, S5-163153, May 23-27, 2016, 20 pages.

* cited by examiner

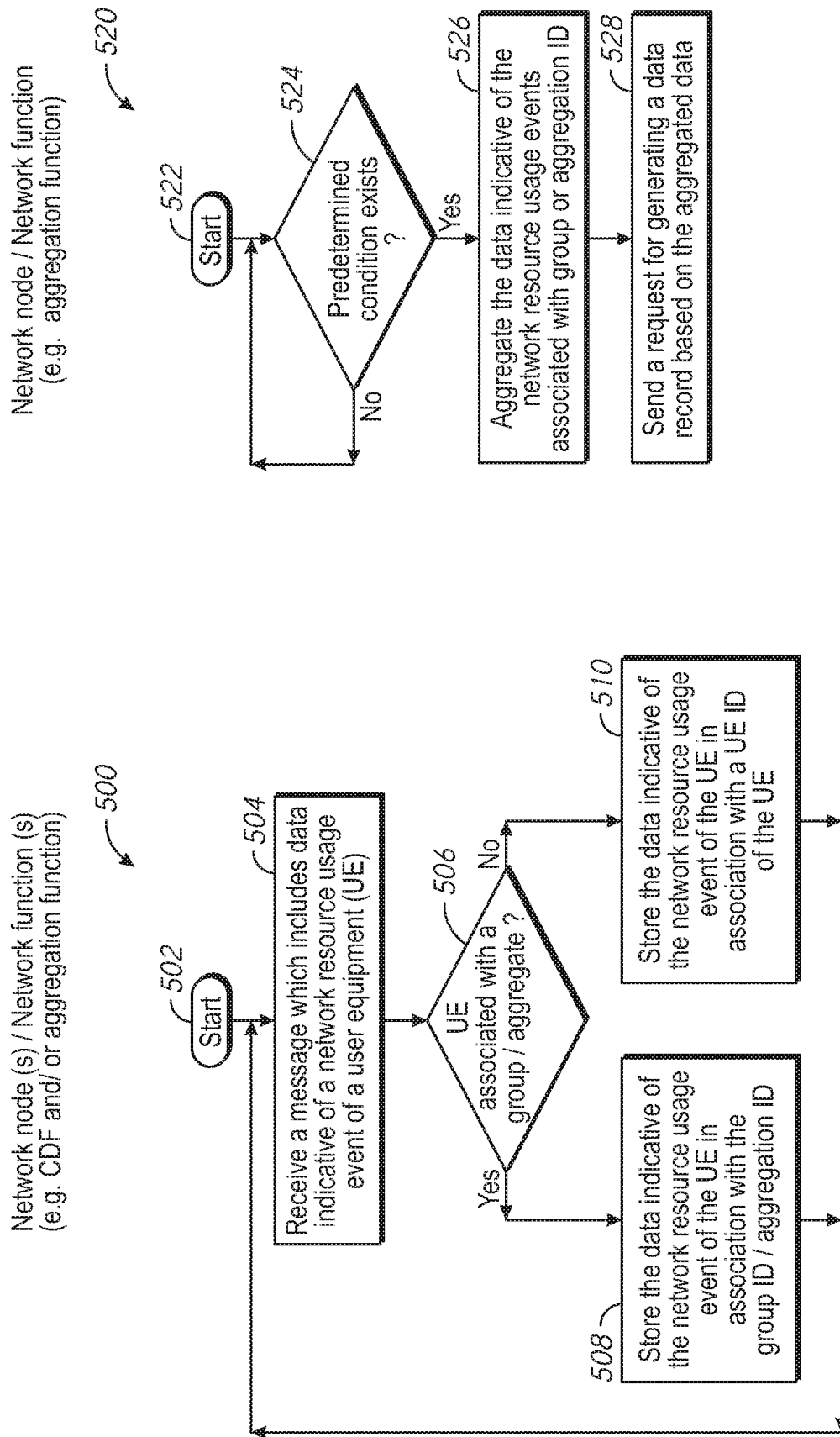

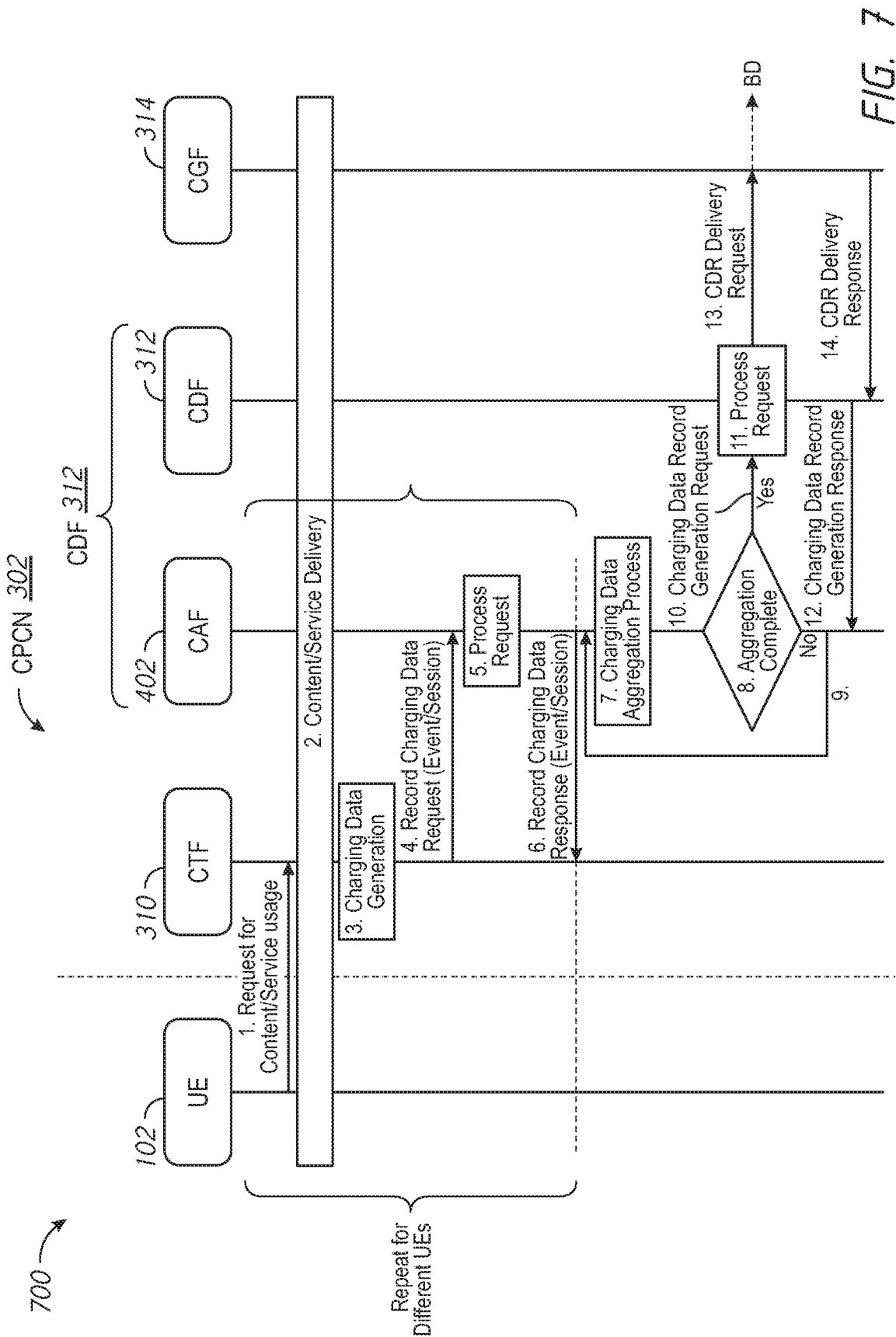

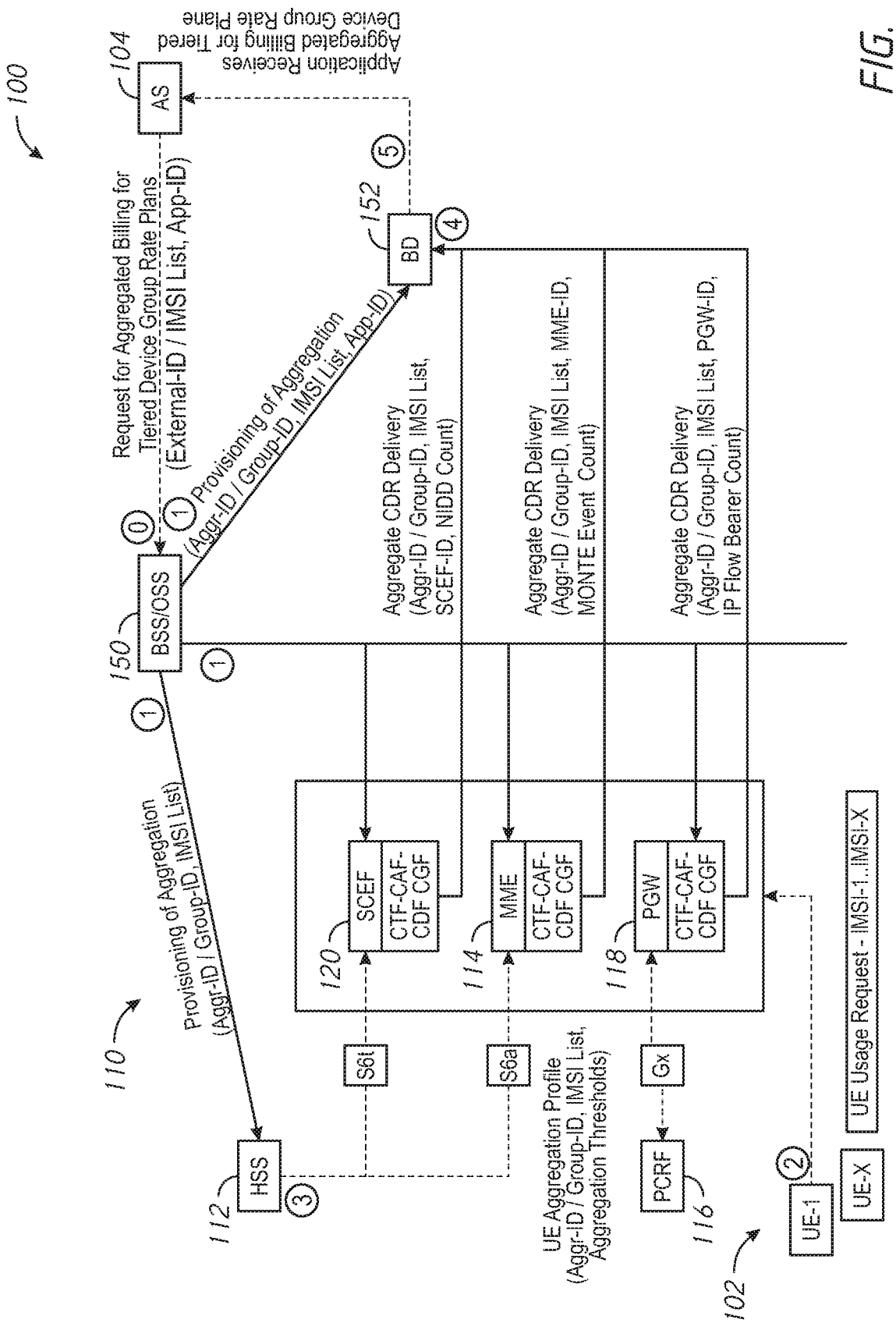

| Information Element (IE) | Category | Description |
|---|---|---|
| Service Information | $O_M$ | This is a structured field and holds the 3GPP specific parameter as defined in TS 32.299 [50]. |
| Group Identifier | $O_M$ | This field Contains the identification of the user (I.e. IMSI, and MISSION if any). |
| Node Functionality | $O_M$ | This field Contains the function of the CPCN node (I.e. SCEF, IWK-SCEF, MME). |
| PDN Connection Charging identifier | $O_M$ | This parameter holds the charging ID for this PDN connection (this together with the SCEF ID constitutes a unique identifier for the PDN connection). |
| Node Id | Oc | This IE holds the name of the Node. |
| Called Station Id | OC | This parameter contains the identifier of the access point (APN) the user is connected to. |
| Charging Characteristics | OC | The charging characteristics applied to this PDN connection in the CPCN.<br># Determined my the SCEF |
| Charging Characteristics Selection Mode | OC | Holds information about how charging characteristics were selected.<br># New value: Group Specific |
| RAT Type | OC | This field indicates which Radio Access Technology (RAT) is currently serving the UE as defined in TS 29.061 |
| Serving Node MCC MNC | OC | This field holds the MCC and MNC serving the UE. |
| Serving PLMN Rate Control | OC | This parameter holds the serving PLMN Rate control used by MME during this record. |
| Group APN Rate Control | OC | This parameter holds APN Rate Control enforced in the SCEF during this record.<br># Group based APN rate control |
| Change Condition | Oc | This field holds the reason for sending charging data request from the CPCN. |
| Diagnostics | OC | This parameter holds a more detailed reason for the release of the PDN connection, when a single cause is applicable, and complements the "Change Condition" information.<br>Last T6a session release; All group members disconnected session Life timer |
| CPDT Information | $O_M$ | This is a structured field and holds the CP data transfer specific parameters. |

FIG. 13

| 1400 → | 1402 | 1404 | CPDT Information | 1406 |
|---|---|---|---|---|
| | Group Identifier | OC | This parameter holds the external identifier identifying the served party associated to the group | |
| | MME ID List | OC | This parameter holds the identity of the MME used for this PDN connection of UE #. SCEF keeps track / creates a list of the MME/s that initiated the T6a session establishment | |
| | Serving Node Identity | OC | This parameter holds the MME identity of the MME serving the UE. | |
| | Serving Node Change | OC | This parameter is present if this is first charging data request after a change from another MME. | |
| | NIDD Submission | OC | This parameter holds the NIDD submission container associated to trigger conditions met. | |
| | Submission Timestamp | OC | This parameter holds the the time stamp when the data transfer request NIDD submission was submitted to the CPCN node.<br># Group submission time stamp | |
| | Event Timestamp | OC | This parameter holds the time stamp when the event triggered the generation of charging information from the CPCN node, for the NIDD submission. | |
| | Group Data Volume Uplink | OC | This parameter holds the data volume transmitted in uplink direction<br># Group UL | |
| | Group Data Volume Downlink | OC | This parameter holds the data volume transmitted in downlink direction<br># Group DL | |
| | Group T6a Report | OC | Grouped AVP: Number of UEs and lists of UE IDs attached | |
| | Group MO Report | OC | Grouped AVP: Number of UEs and lists of UE IDs that sent MO data | |
| | Group MT Report-Success | OC | Grouped AVP: Number of UEs and lists of UE IDs that received MT data | |
| | Group MT Report-Partial Delivery | OC | Grouped AVP: Number of UEs and lists of UE IDs that failed receive MT data | |
| | Group Result Code | OC | This parameter holds the result of NIDD group submission<br># Sucess: MT delivery to all group members<br># Partial delivery: MT delivery failure to one or more group member | |

FIG. 14

| AVP Name | AVPs | Description |
|---|---|---|
| MME ID-List | Serving Node Identity | List of MME IDs. Group members many attach to different MMEs. Interim report includes the list of MMEs groups attached to |
| Group T6a Report | Grouped AVP: Number of UEs #integer Subscriber Identifier | Number of group members that attached to the network during the Interim reporting period List of UE IDs included in the report |
| Group MO Report | Number of UEs Subscriber Identifier | Number of group members that sent MO data during the Interim reporting period List of UE IDs included in the report |
| Group MT Report-Sucess | Enumerated (1) | MT data sent to all UEs in the group |
| Group MT Report Partial Delivery | Number of UEs Subscriber Identifier | Number of group members MO data during the Interim reporting period List of UE IDs included in the report |
| Group Result Code | Enumerated: 0: Partial MT Delivery Sucess 1: MT Delivery Sucess | |
| Group Data Volume Uplink | Unsigned32 and holds the volume in bytes of the received MO data from group member | |
| Group Data Volume Downlink | Unsigned32 and holds the volume in bytes of the received MT data to group member | |

FIG. 15

PROCESS-EFFICIENT GENERATION OF DATA RECORDS FOR DATA COMMUNICATIONS INVOLVING GROUPS OR AGGREGATES OF IOT DEVICES

TECHNICAL FIELD

The present disclosure relates generally to methods, apparatus and systems for use in generating data records for data communications involving groups or aggregates of mobile devices, such as Internet of Things (IoT) devices, operative in mobile or wireless networks.

BACKGROUND

A need has been identified for a more process-efficient generation of data records for data communications associated with mobile devices, such as Internet of Things (IoT) devices, operating in mobile or wireless networks.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5B are flowcharts for describing methods for use in generating data records for communications associated with groups or aggregates of UEs, such as IoT devices, operating in mobile or wireless networks;

FIG. 7 is a process flow diagram for describing a method for use in generating CDRs for data communications associated with groups or aggregates of UEs, such as IoT devices, operating in mobile or wireless networks;

FIG. 8 is an illustrative representation of the communication system which includes the mobile network as described in FIG. 1, incorporating the functions and techniques as described in relation to FIGS. 4A-4C, 5A-5B, 6 and 7;

FIG. 13 is a table including a service-information attribute-value pair (AVP) of a charging data request, for use with the OFCS in the method of FIG. 11;

FIG. 14 is a table including a control plane data transfer (CPDT) AVP of the service-information AVP of FIG. 13, for use with the OFCS in the method of FIG. 11; and FIG. 15 is a table which defines CPDT AVPs for use with groups of UEs and associated with FIG. 14, for use with the OFCS in the method of FIG. 11.

Figure 1:
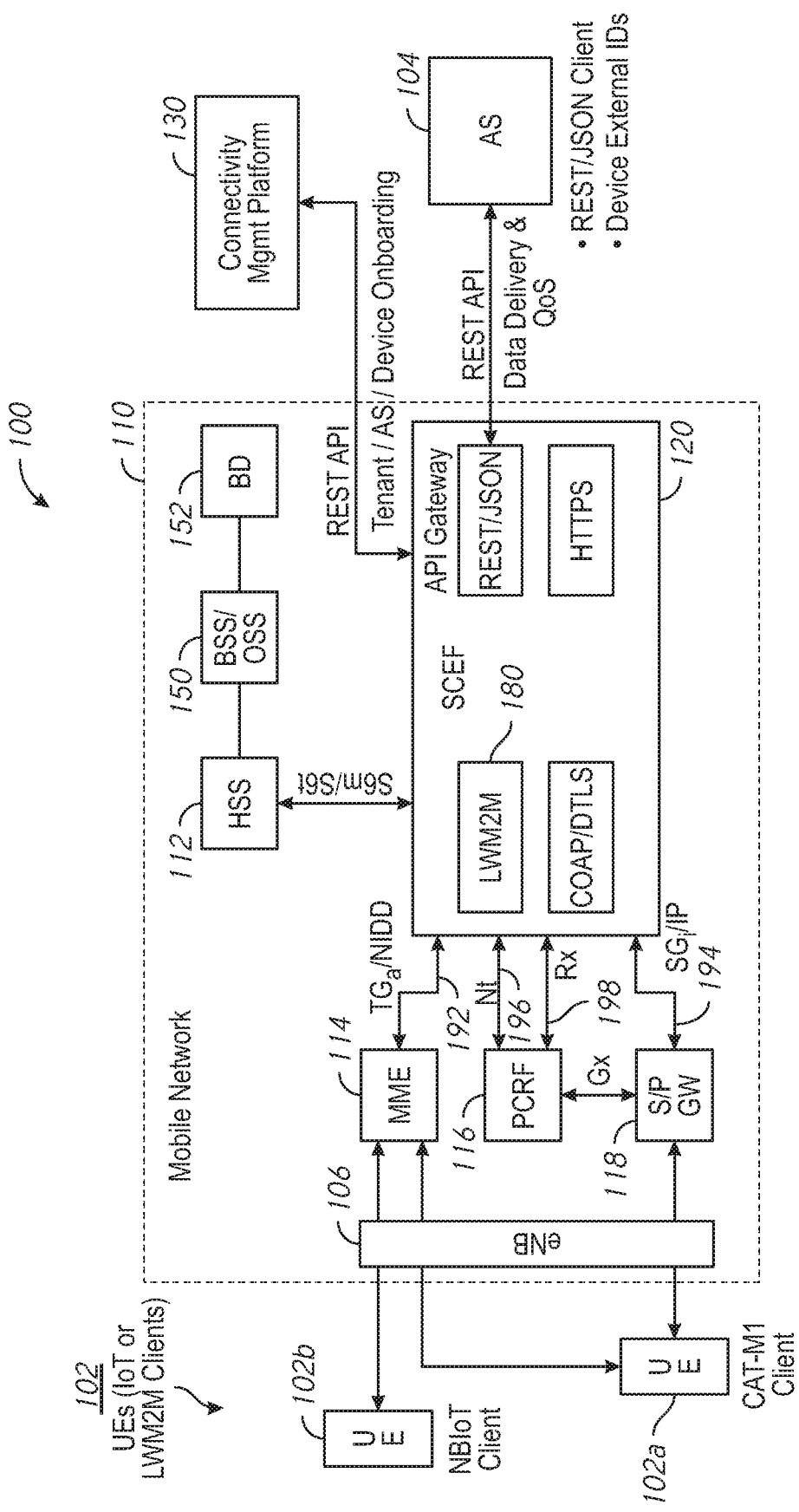
FIG. 1 is an illustrative representation of a communication system which includes a mobile network for providing wireless communications for a plurality of user equipments (UEs), such as Internet of Things (IoT) devices.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods, apparatus, and systems for use in the process-efficient generation of data records for data communications involving groups or aggregates of user equipment (UEs), such as Internet of Things (IoT) devices, are described herein.

In one illustrative example, for each one of a plurality of UEs associated with a group or aggregation identifier (ID), a request which includes data indicative of a network resource usage event of the UE is received and the data are stored in association with the group or aggregation ID. In response to identifying a predetermined condition, the data indicative of the network resource usage events associated with the group or aggregation ID are aggregated. A request for generating a data record based on the aggregated data is then sent to a data function for generating a data record. The generated data record may be stored for subsequent retrieval, for reporting, analysis, billing, and/or communications management. The predetermined condition may be or include, as examples, an expiration of a time period, or a detection of a volume limit for data transfers involving the plurality of UEs.

The technique may be performed by one or more network nodes or functions of a mobile network. For example, the one or more network nodes or functions comprise a charging data function (CDF) which includes an aggregation function, where the request including the data indicative of the network resource usage event is a charging data request from a charging trigger function (CTF), and the request for generating a data record is a request for generating a charging data record (CDR). The CDR may sent via a charging gateway function (CGF) for receipt at a billing domain entity.

A system of the present disclosure may include one or more network nodes of a control plane (CP) entity for data transfer charging (e.g. a control plane data transfer charging node or "CPCN"). The one or more network nodes may have a CTF and a CDF which may include an aggregation function. The CTF may be configured to, for each one of a plurality of UEs associated with a group or aggregation ID, send to the CDF (or the aggregation function thereof) a charging data request which includes charging data indicative of a charging event of the UE. The CDF (or the aggregation function thereof) may be configured to, for each one of the plurality of UEs associated with the group or aggregation ID, receive from the CTF the request which includes the charging data indicative of the network resource usage event and store the charging data in association with the group or aggregation ID. The aggregation function may be configured to, in response to identifying a predetermined condition, aggregate the charging data indicative of the charging events associated with the group or aggregation ID, and provide to the CDF a charging data record generation request for generating a CDR based on the aggregated data. The CDR may sent via a CGF for receipt at a billing domain entity.

In at least some other implementations, a request for a data transfer between an AS and a plurality of UEs of a group associated with a group ID is received. In response to the request for the data transfer, data are communicated between the AS and the plurality of UEs of the group associated with the group ID. A request for generating a data record for the data transfer for the plurality of UEs of the group associated with the group ID is sent to a system for generating data records. The request for generating the data record may include, for example, an attribute value pair (AVP) indicating a volume of the data transfer for the plurality of UEs of the group, one or more AVPs indicating success or partial failures in the data transfer for the plurality of UEs of the group, and/or an AVP indicating an identity of a CP entity for mobility management used in the data transfer for the plurality of UEs of the group. The request for generating the data record may be a charging data request for generating a CDR, where the CDR is sent via a CGF for receipt at a billing domain entity.

More detailed, additional, and alternative techniques and implementations are described further below.

Example Embodiments

Electronic data records may be generated for a variety of different purposes, such as for documenting communications associated with mobile devices operating in mobile (wireless) networks. Such data records may be stored for subsequent retrieval for reporting, analysis, billing, or communications management. A particular need for a more process-efficient generation of data records for data communications associated with Internet of Things (IoT) devices operating in mobile networks has been identified.

With reference to FIG. 1, an illustrative representation of a communication system 100 which includes a mobile network 110 is shown. Mobile network 110 of FIG. 1 is configured as a Fourth generation (4G), Long Term Evolution (LTE), Evolved Packet Core (EPC) based mobile network. Mobile network 110 includes a plurality of network nodes or entities, such as a home subscriber server (HSS) 112, a mobility management entity (MME) 114, a policy and charging rules function (PCRF) 116, a serving/packet data network (S/P) gateway (S/P GW) 118, and a service and capability exposure function (SCEF) 120. Mobile network 110 may further include a business support system (BSS)/operations support system (OSS) 150 and a billing domain (BD) entity 152. A plurality of user equipment (UEs) 102 may access mobile network 110 via one or more base stations, such as an eNodeB (eNB) 106, for communication.

SCEF 120 is one type of network node configured for exposure of services and capabilities of the mobile network 110, and for interfacing with application servers (e.g. an application server or AS 104). SCEF 120 may interface with AS 104 (e.g. with use of a REST API) for communicating data between the AS 104 and UEs 102. A connectivity management platform 130 may also be used in association with SCEF 120. Further, SCEF 120 may interface with one or more MME entities (e.g. MME 114) for non-IP data delivery (NIDD), and one or more S/P GW entities (e.g. S/P GW 118) and one or more PCRFs entities (e.g. PCRF 116) for IP data delivery. A first mobile network route for data communication makes use of a T6a interface 192 for NIDD, and a second mobile network route for data communication makes use of a SGi interface 194 which terminates at SCEF 120 for IP data delivery. In preferred implementations, SCEF 120 is an enhanced SCEF (eSCEF) described in 3GPP TS 23.682 specifications.

UEs 102 may include lightweight machine-to-machine (LWM2M) devices, such as a UE 102a which is a CAT-M1 device and a UE 102b which is a Narrowband (NB) IoT device. Note that SCEF 120 may include a LWM2M server 180 configured for use with UEs that are LWM2M clients, as well as other applicable functionalities such as Constrained Application Protocol (CoAP) and Datagram Transport Layer Security (DTLS) functions. Basic processing associated with CAT-M1 devices (e.g. UE 102a) and NB-IoT devices (e.g. UE 102b) are now briefly discussed. UE 102a, which is a CAT-M1 device, is configured to support IP data delivery for wideband (WB) data communication, as well as NIDD for narrowband (NB) data communication. SCEF 120 may become aware when UE 102a connects to mobile network 110 via the PCRF/SCEF interface. At this time, SCEF 120 may create a context for UE 102a which includes its IP address as an identity. For mobile-terminated (MT) data to be delivered to UE 102a, given the creation of the UE context, SCEF 120 may send MT data from AS 104 to UE 102a via S/P-GW 118 over the SGi interface 194. Note that AS 102 may not even be aware how MT data is delivered to UE 102a (i.e. whether over the SGi interface 194 for IP data delivery or the T6a interface 192 for NIDD).

NB IoT is a Low Power Wide Area Network (LPWAN) radio technology developed to enable a wide range of devices and services to be utilized in cellular bands. An NB IoT device, such as UE 102b, is a constrained device that is not configured to support IP data delivery; rather, NB IoT devices are configured to support NIDD for NB data communication. For NIDD, AS 104 may initiate a procedure that triggers an NIDD configuration procedure between SCEF 120 and HSS 112. As a result of the procedure, an HSS record of UE 102b indicates that 120 will handle the connection to the access point name (APN). This information may be sent to MME 114 as part of the attachment procedure. MME 114 may initiate a T6a session establishment to SCEF 120. MT data for delivery to UE 102b may be sent over the T6a interface 192 to MME 114 based on the UE context (and/or session record) created when the T6a session establishment is performed.

Figure 2:
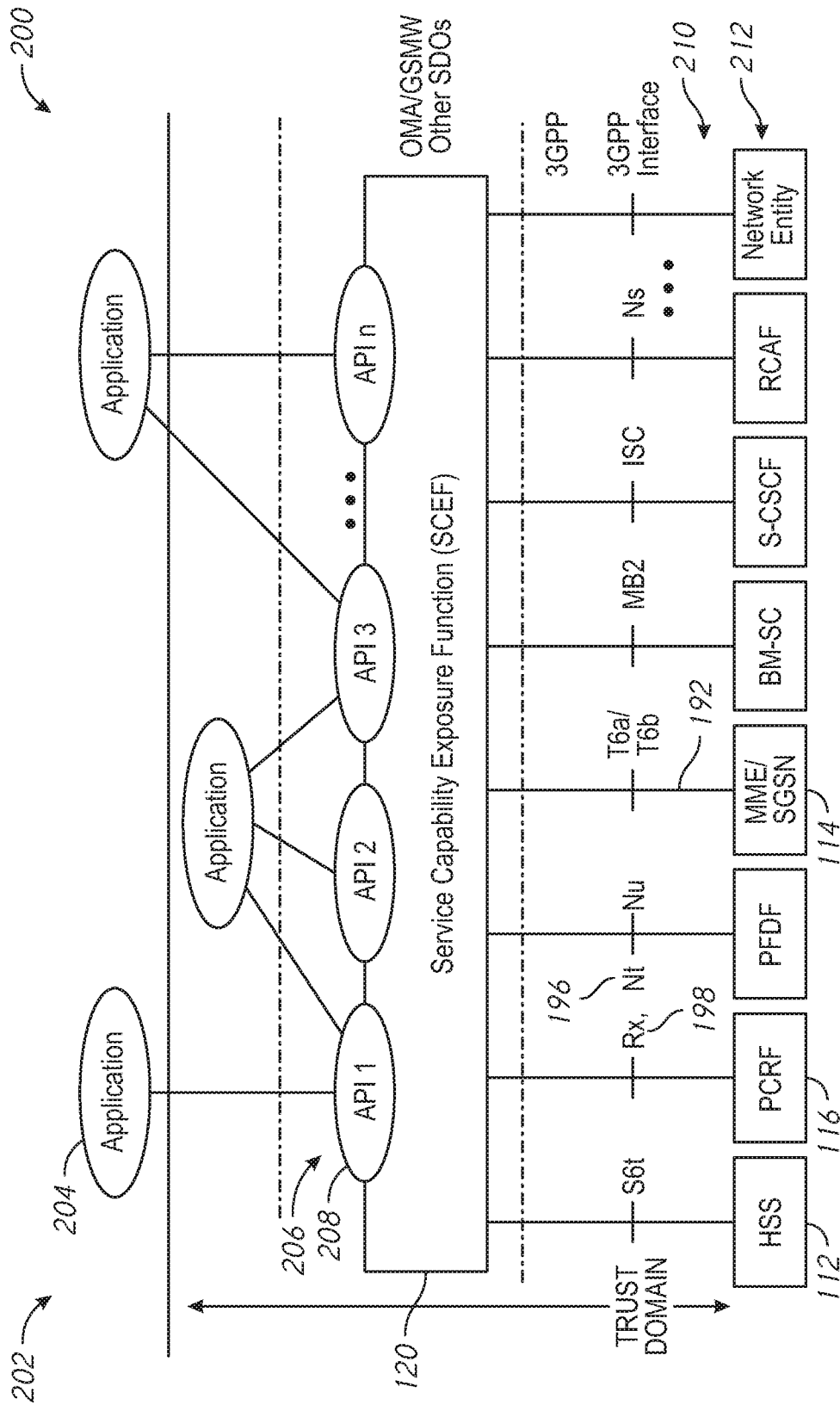
FIG. 2 is an illustrative representation of a reference architecture of a service and capability exposure function (SCEF) in the mobile network of FIG. 1.

FIG. 2 is a basic illustrative representation of SCEF reference architecture 200 of SCEF 120. The basis for SCEF reference architecture 200 of FIG. 2 may be found in $3^{rd}$ Generation Partnership Project (3GPP) Technical Specification (TS) 23.682 (i.e. 3GPP TS 23.682). In SCEF reference architecture 200, SCEF 120 is shown to include one or more application programming interfaces (APIs) 206 (such as an API 208) for one or more applications 202 (such as an application 204) of the application servers. The one or more applications 202 may include third-party applications for third-part application servers. A plurality of 3GPP interfaces 210 are defined between SCEF 120 and a plurality of other network entities 212 in the mobile network. 3GPP interfaces relevant to techniques of the present disclosure include the T6a interface 192 for interfacing with MME 114, and Nt and Tx interfaces 196 and 198 (FIGS. 1 and 2) for interfacing with PCRF 116.

Again, SCEF 120 is one type of network node configured for exposure of services and capabilities of mobile network 110, as well as for interfacing with application servers for communication of data via the mobile network 110. Another type of network node configured for exposure of services and capabilities of a mobile network is a network exposure function (NEF) node of a 5G mobile network (not shown in FIGS. 1 and 2). Here, in some implementations, the NEF may interface with one or more access and mobility management (AMF) entities for NIDD, and/or one or more user plane functions (UPF) entities and one or more policy control function (PCF) entities for IP data delivery.

Referring back to FIG. 1, note that electronic data records may be generated for network resource usage events (e.g. data communications or transfers) of the UEs 102 in mobile network 110. The data records may be stored for subsequent retrieval for reporting, analysis, billing, or communications management. For example, billing for communications involving UEs 102 typically involves the generation of charging data records (CDRs) for chargeable events. Any chargeable event per subscriber in the form of a CDR can be monetized by the operator of mobile network 110.

Figure 3A:
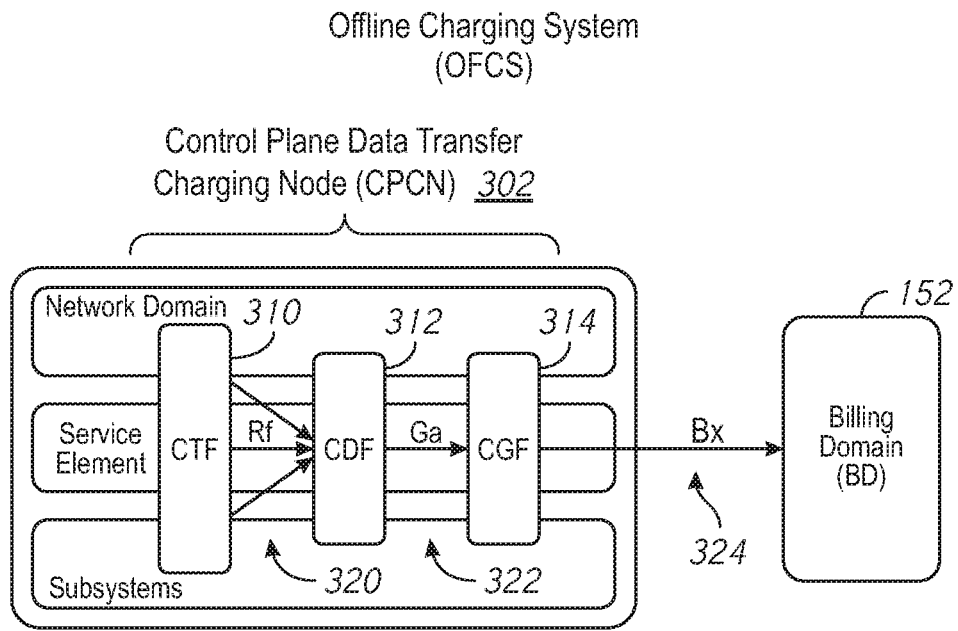
FIGS. 3A-3B are illustrative representations of a control plane data transfer charging node (CPCN) of the mobile network of FIG. 1, where the CPCN has a plurality of network functions including a charging trigger function (CTF), a charging data function (CDF) for generating a charging data record (CDR), and a charging gateway function (CGF)
Figure 3B:
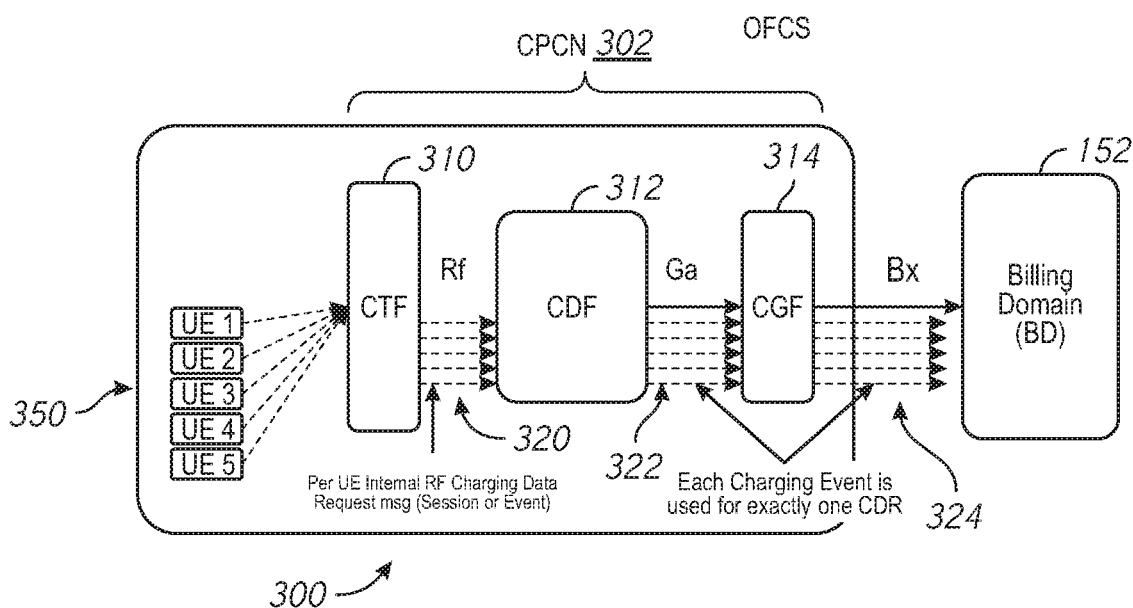

To further explain, an offline charging system (OFCS) of the mobile network is shown in relation to FIGS. 3A-3B, which includes a control plane data transfer charging node (CPCN) 302 of the mobile network of FIG. 1. CPCN 302 of FIG. 3A is detailed in 3GPP documentation, such as TS 32.240 and TS 32.299. In FIG. 3A, CPCN 302 has a plurality of network functions which include a charging trigger function (CTF) 310, a charging data function (CDF) 312, and a charging gateway function (CGF) 314. CTF 310 may interface with CDF 312 via an Rf interface 320, and CDF 312 may interface with CGF 314 via a Ga interface. CGF 314 may interface with a billing domain (BD) entity 152 via a Bx interface 324. In general, CTF 310 is configured to generate and send a charging data request to CDF 312 in response to detecting a network resource usage event (e.g. a charging event) of a UE. CDF 312 is configured to generate a charging data record (CDR) in response to receiving a charging data request from CTF 310. CDF 312 is further configured to send the CDR via CGF 314 for receipt and processing at the BD 152.

The OFCS of the mobile network may process events from UEs that are IoT devices. Note that LPWAN is becoming the preferable deployment choice for IoT applications, including smart city, smart industries, and smart agriculture use cases. Such "smart IoT devices" have to reliably communicate with applications in small bursts of data associated with different traffic models. These traffic models are varied based on the frequency of data transferred (e.g. from one to few times a day, to a few times in a month or a year). A smart IoT device may have many brief data sessions, each of which is an individually chargeable event. Each event would trigger the generation of a CDR, resulting in a large number of CDRs. The large number of CDRs for such small data transfers may overwhelm operator billing systems, adding significant processing costs to generate invoices for billing. The additional cost to process small and infrequent CDRs for data sessions would seem to negatively impact an attempt to adopt the new technology at a low cost. This becomes even more important for non-IP data delivery (NIDD) using the SCEF, as the traffic pattern for NIDD will be small and infrequent.

With reference to FIG. 3B, each one of a large number of UEs 350 may use a network resource in the mobile network. For example, an IoT device may be involved in a data transfer involving a small amount of data. Each network resource usage by a UE may cause a record charging data request 320 to be generated and sent from CTF 310 to CDF 312. In response, CDF 312 may generate and send a CDR 322 corresponding to the record charging data request 320. CDR 322 may be received at CGF 314, which forwards a corresponding CDR 324 to BD 152 for processing. As is apparent, a large number of CDRs from a large number of UEs 350 may overwhelm operator billing systems, adding significant processing costs to generate invoices and billing.

Thus, a more process-efficient generation of data records for data communications associated with IoT devices operating in mobile or wireless networks is needed.

According to at least some implementations of the present disclosure, what are described are techniques for lowering the number of generated data records for IoT devices, using an aggregation mechanism to aggregate event data from the IoT devices for the generation of a single aggregate data record (e.g. an aggregate CDR) based on the aggregated event data.

In one implementation, what is provided is aggregated data record generation using a group identifier (ID). Here, a number of UEs with similar characteristics are grouped together and assigned to a group ID. The group ID along with its associated UE members may be provisioned at the MME, SCEF, BD, and/or the AS. The MME and SCEF may trigger the opening of a CDR when the first UE member of the group attaches to the network. The group ID may be stored in the CDR. As additional UE members attach to the network, a UE ID of the UE may be added to the CDR. The SCEF and MME may keep track of group usage (e.g. data volume and/or time usage), group PLMN rate control, and group APN rate control, and close the CDR when a condition is met.

In another implementation, what is provided is aggregated data record generation using an aggregation ID. Here, the unique identifier may be assigned to a UE profile of a UE that belongs to a common service plan. The aggregation ID may be provisioned as part of the HSS profile or on one or more network elements, such as the SCEF or MME. Here, the aggregation ID may be derived from the PCF for user plane delivery via the PGW.

These aggregation identifiers may be generated by a network element, such as the SCEF, and encompass or otherwise be based on an external identifier received from the AS or its application. The aggregation identifiers may use or otherwise be based on group identifiers per the groups provisioned at the HSS, SCEF, and/or AS. Activation may be made via the group configuration REST API (i.e. from the AS to the SCEF); diameter T6a group NIDD Authorization command (i.e. from the SCEF to the HSS) per 3GPP TS 23.682.

The aggregation identifiers may be shared with the network elements, such as the CPCN, so that its included as part of the CTF accounting metrics collection and forwarding sent to the CDF for CDR generation. This will allow correlation of the CDRs in the CAF to generate an aggregate CDR for multiple IMSIs and events before it reaches the billing domain.

In some implementations, an aggregate CDR may be generated in response to identifying any one or more of one or more closure conditions. The aggregation may be a time-based aggregation, a usage-based aggregation, an application-aware based aggregated, an application triggered aggregation, and/or a monitored event triggered aggregation. An aggregate CDR may include traditional CDR data fields per TS 32.253, and further include one or more additional fields including CDR type (individual or aggregate); total number of SCEF/PDN session establishments; total number of events generated and delivered; cumulative usage duration; cumulative usage volume; and list of source IMSIs that attached to the network at CDR closing and target destination networks.

Figure 4A:
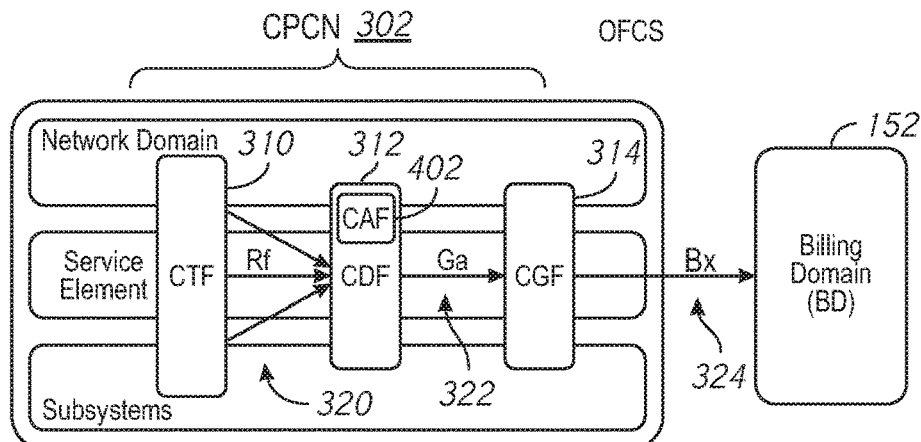
FIGS. 4A-4C are illustrative representations of a CPCN according to some implementations of the present disclosure, where the CDF includes an aggregation function or charging aggregation function (CAF) for aggregating data indicative of network resource usage events of groups or aggregates of UEs.
Figure 4B:
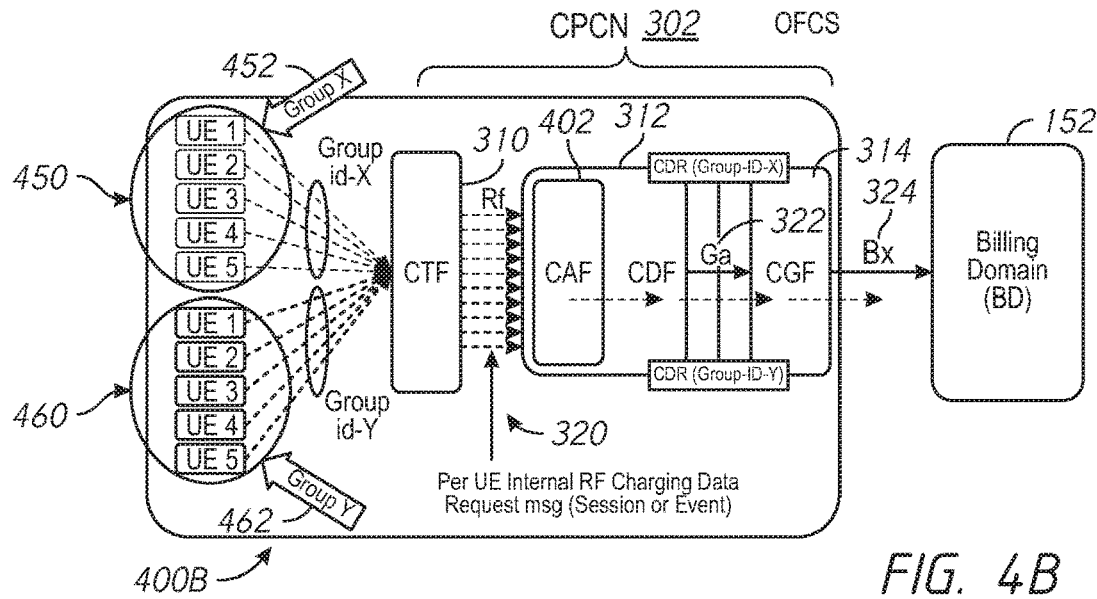
Figure 4C:
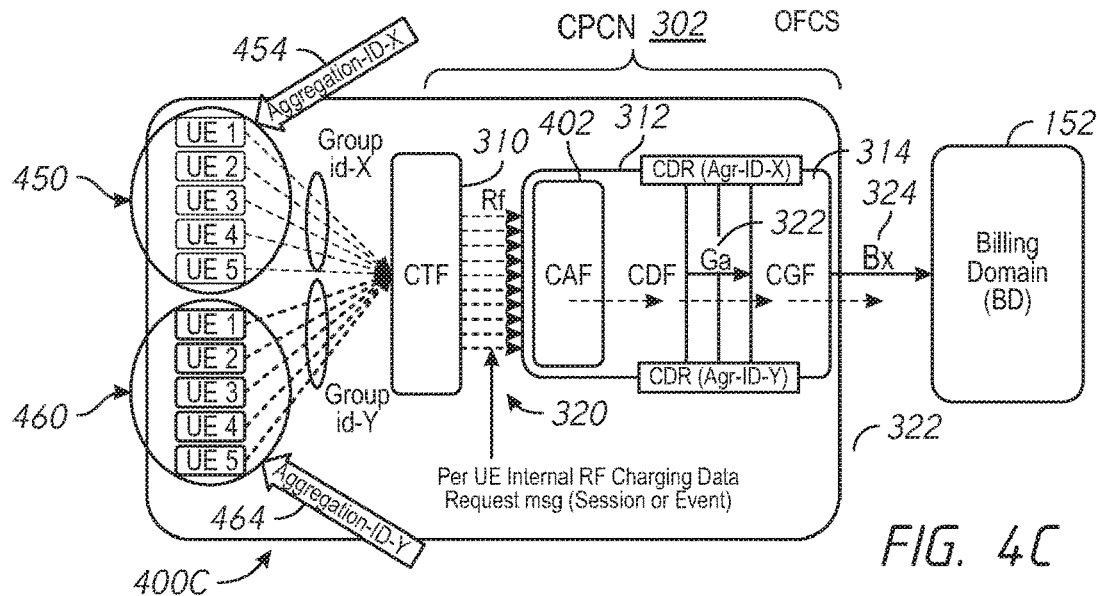

FIGS. 4A-4C are illustrative representations of CPCN 302 according to some implementations of the present disclosure. In FIG. 4A, CPCN 302 is show to include an aggregation function or charging aggregation function (CAF) 402 as part of CDF 312 for aggregating data indicative of network resource usage events of a group or aggregate of UEs. The aggregated data is used for the generation of an aggregate CDR associated with the group or aggregate of UEs. In some implementations, CAF 402 is provided separate and apart from CDF 312.

In some implementations with reference to FIG. 4B, each one of a plurality of groups of UEs may be associated with a (unique) group ID. The group ID may be associated with a list of UE IDs (e.g. IMSIs) corresponding to the UEs in the group. For example, a first plurality of UEs 450 associated with a first group may be associated with a first group ID 452 ("Group ID-X" as indicated) and a second plurality of UEs 460 associated with a second group may be associated with a second group ID 462 ("Group ID-Y" as indicated). For each one of the first plurality of UEs 450 associated with the first group ID 452, CTF 310 may be configured to send to the CDF 312 (or the CAF 402) a charging data request which includes charging data indicative of a charging event of the UE. The CDF 312 (or the CAF 402) may be configured to, for each one of the first plurality of UEs 450 associated with the first group ID 452, receive from the CTF 310 the charging data request which includes the charging data indicative of the charging event, and store the charging data in association with the group ID 452. The CAF 402 may be configured to, in response to identifying a predetermined condition (e.g. expiration of a time period or reaching a volume limit), aggregate the charging data indicative of the charging events associated with the first group ID 452 and provide to the CDF 312 a charging data record generation request for generating a CDR based on the aggregated data. The CDF 312 may be configured to generate a CDR based on the aggregated data in response to receiving the charging data record generation request. CDF 312 may be further configured to send the CDR to CGF 314 via the Ga interface 322, for communication to BD 152 via the Bx interface 324 for processing. The above-described process may be performed for the one or more other groups of UEs (e.g. the second plurality of UEs 460 associated with the second group ID 462). Comparing the process of FIG. 4B to that of FIG. 3B, the number of CDRs communicated over Ga interface 322 and Bx interface 324 may be reduced.

In other implementations with reference to FIG. 4C, each one of a plurality of aggregates of UEs may be associated with an (unique) aggregation ID. The aggregation ID may be associated with a list of UE IDs (e.g. IMSIs) corresponding to the UEs in the aggregate. For example, the first plurality of UEs 450 associated with a first aggregate may be associated with a first aggregation ID 454 ("Aggregation ID-X" as indicated) and a second plurality of UEs 460 associated with a second aggregate may be associated with a second aggregation ID 464 ("Aggregation ID-Y" as indicated). Here, CTF 310 may be configured to, for each one of first plurality of UEs 450 associated with first aggregation ID 454, send to the CDF 312 (or the CAF 402) a charging data request which includes charging data indicative of a charging event of the UE. The CDF 312 (or the CAF 402) may be configured to, for each one of the first plurality of UEs 450 associated with the first aggregation ID 454, receive from the CTF 310 the charging data request which includes the charging data indicative of the charging event and store the charging data in association with first aggregation ID 454. The CAF 402 may be configured to, in response to identifying a predetermined condition, aggregate the charging data indicative of the charging events associated with the first aggregation ID 454, and provide to the CDF 312 a charging data record generation request for generating a CDR based on the aggregated data. The CDF 312 may be configured to generate a CDR based on the aggregated data in response to receiving the charging data record generation request. CDF 312 may be further configured to send the CDR to CGF 314 via the Ga interface 322, for communication to BD 152 via the Bx interface 324 for processing. The above-described process may be performed for the one or more other groups of UEs (e.g. the second plurality of UEs 460 associated with the second aggregation ID 464). Comparing the process of FIG. 4B to that of FIG. 3B, the number of CDRs communicated over Ga interface 322 and Bx interface 324 may be reduced.

FIGS. 5A-5B are flowcharts 500 and 520 for describing methods for use in generating data records for communications associated with groups or aggregates of UEs, such as IoT devices, operating in mobile or wireless networks. The methods may be embodied in and/or performed by one or more network nodes or functions in a mobile network. A network node may be a server, a network element, a network device, or network equipment in the mobile network. The methods may be further embodied as one or more computer program products each including a non-transitory computer readable medium and instructions stored in the computer readable medium where the instructions are executable on one or more processors of the one or more network nodes for performing the steps of the method.

In FIG. 5A, a group or aggregate of UEs may be associated with a (unique) group or aggregation ID; the group or aggregation ID may be associated with a list of UE IDs (e.g.

IMSIs) corresponding to the UEs in the group or aggregate. Beginning at a start block 502 of the flowchart 500 of FIG. 5A, a request which includes data indicative of a network resource usage event of a UE may be received (step 502 of FIG. 5A). The network resource usage event may be a data transfer or communications between an application server (AS) and the UE. The network resource usage event may be a chargeable event. If the UE is associated with a group or aggregation ID ("Yes" as identified in step 506 of FIG. 5A), the data indicative of the network resource usage event may be stored in association with the group or aggregation ID (step 508 of FIG. 5A). In some implementations of step 508, the data may be stored in association with both the group or aggregation ID and the UE ID of the UE. If the UE is not associated with a group or aggregation ID ("No" as identified in step 506 of FIG. 5A), the data indicative of the network resource usage event may be stored in association with the UE ID associated with the UE (step 508 of FIG. 5A). In some implementations, the UE ID may be an IMSI of the UE. The method of FIG. 5A may be repeated, where the receiving (i.e. step 504 of FIG. 5A) and the storing (i.e. step 508 of FIG. 5A) may be performed for each one of a plurality of UEs associated with the group or aggregation ID, such that a plurality of data indicative of a plurality of network resource usage events of the plurality of UEs are stored in association with the group or aggregation ID.

Continuing at a start block 522 of the flowchart 520 of FIG. 5B, it may be identified whether a predetermined condition exists (step 524 of FIG. 5B). The predetermined condition may be a closure condition, for example, an expiration of a time period or a reaching of a volume limit for data transfers involving the plurality of UEs. If the predetermined condition is identified to exist at step 524, the stored data indicative of the plurality of network resource usage events associated with the group or aggregation ID may be aggregated (step 526 of FIG. 5B). A request for generating a data record based on the aggregated data may be sent to an entity configured to generate a data record based on the aggregated data (step 528 of FIG. 5B). The generated data record may include the group or aggregation ID and stored for subsequent retrieval and/or processing. Note that the method of flowchart 520 of FIG. 5B may directly follow step 508 of FIG. 5A, or may be performed as a process that is separate and independent from the flowchart 520 of FIG. 5B.

The generated data record may be subsequently processed or used for reporting, analysis, billing, and/or communications management. In some implementations, the generated data record may be for use in data analytics in order to study end device and network behaviors, as well as for network planning and UE profiling (e.g. based on machine learning techniques). In other implementations, the generated data record may be processed or used for billing the enterprise or customer, where a plurality of such generated data records (e.g. CDRs) over a (predetermined) time period are consolidated into a single billing document.

Even further in some implementations, the generated data record may include additional data fields and associated data that characterize the group or aggregate processing. For example, the data fields and associated data in the generated data record may include the group of aggregation ID, a record type (indicating individual or group/aggregate type), a list of UE IDs (e.g. IMSIs) of (attached) UEs, a total number of established sessions (e.g. PDN sessions), a total number of events generated and/or delivered, a cumulative usage duration, and a cumulative usage volume.

In one illustrative application of the methods of FIGS. 5A-5B, the one or more network nodes or functions which perform the method of FIG. 5A may include a charging data function (CDF) and/or an aggregation function of the CDF, where the request in step 504 of FIG. 5A is a charging data request which is received from a charging trigger function (CTF). Here, the network node or function which performs the method of FIG. 5B may the aggregation function, where the request in step 528 of FIG. 5B is a request for generating a charging data record (CDR). The CDR may sent via a charging gateway function (CGF) for receipt at a billing domain entity.

Figure 6:
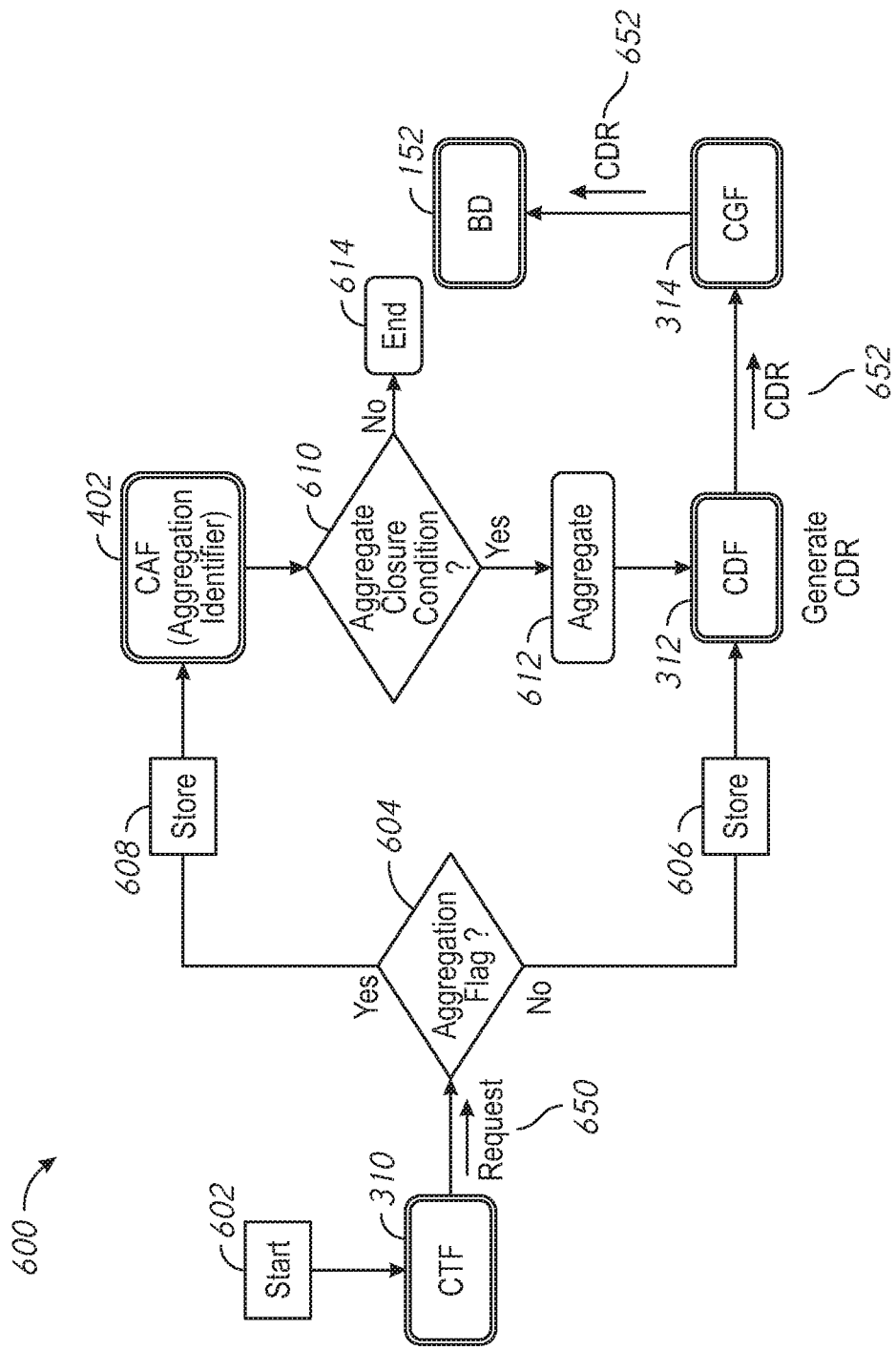
FIG. 6 is a module flow diagram for describing a method for use in generating CDRs for data communications associated with groups or aggregates of UEs, such as IoT devices, operating in mobile or wireless networks.
Figure 9A:
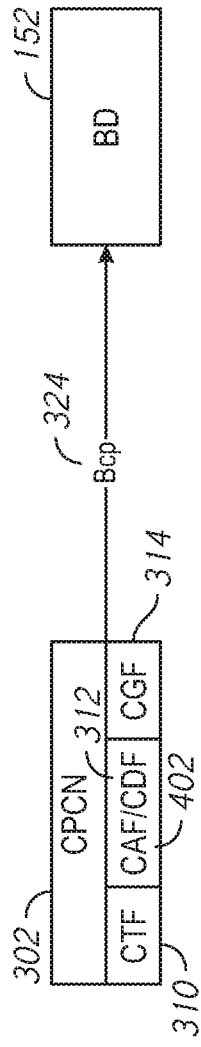
FIGS. 9A-9E are illustrative representations of architecture implementations options for a CPCN having a CTF, a CDF, a CAF, and a CGF.
Figure 9B:
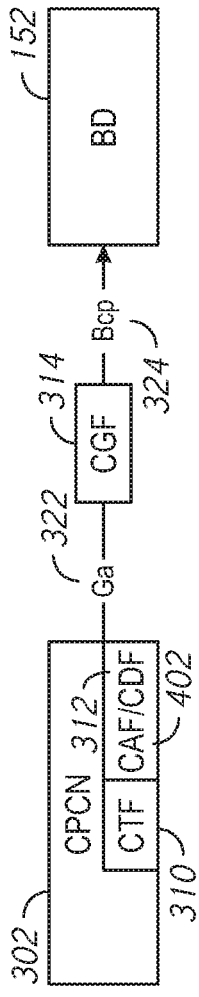
Figure 9C:
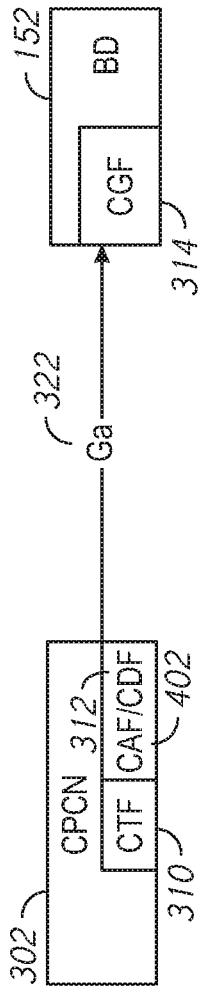
Figure 9D:
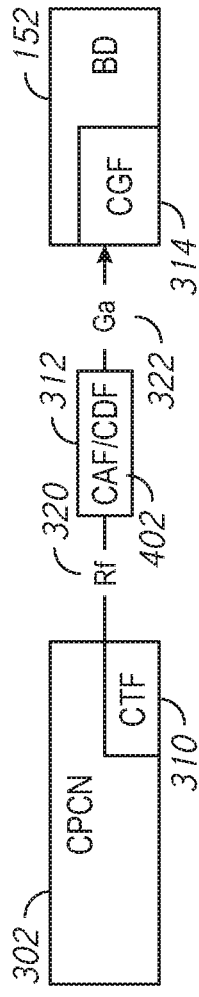
Figure 9E:
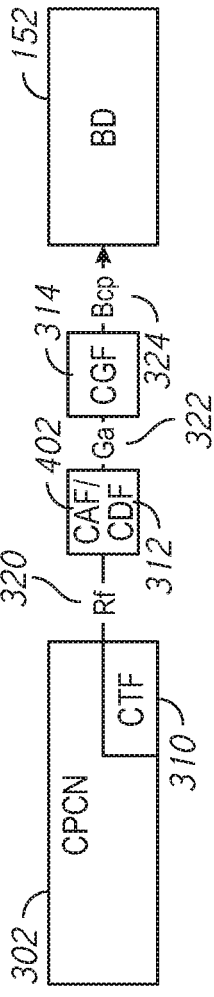

To that end, FIG. 6 is a module flow diagram 600 for describing a method for use in generating CDRs for data communications associated with groups or aggregates of UEs, such as IoT devices, operating in mobile or wireless networks. The method may be embodied in and/or performed by one or more network nodes or functions in a mobile network. A network node may be a server, a network element, a network device, or network equipment in the mobile network. The methods may be further embodied as one or more computer program products each including a non-transitory computer readable medium and instructions stored in the computer readable medium where the instructions are executable on one or more processors of the one or more network nodes for performing the steps of the method.

In FIG. 6, a group or aggregate of UEs may be associated with a (unique) group or aggregation ID associated with a list of UE IDs (e.g. IMSIs) corresponding to the UEs in the group or aggregate. Beginning at a start block 602 of the module flow diagram 600 of FIG. 6, CTF 310 may send a request 650 which includes data indicative of a network resource usage event of a UE. The network resource usage event may be a data transfer or communications between an AS and the UE, a chargeable event. The request may include an aggregation flag or indication, which indicates whether or not aggregation is to be performed (e.g. 0=individual; 1=aggregate). If the request includes an aggregation flag indicating that no aggregation is to be performed ("No" at step 604 of FIG. 6), then the chargeable event may be stored in association with the UE ID (e.g. IMSI) (step 606 of FIG. 6). Here, CDF 312 may generate a CDR 652 corresponding to the chargeable event and associated with the UE ID. CGF 314 may receive the CDR 652 and forward the CDR 652 to the BD 152 for processing (e.g. generating a billing document associated with the UE ID).

On the other hand, if the request includes an aggregation flag indicating that aggregation is to be performed ("Yes" at step 604 of FIG. 6), then the chargeable event may be stored in association with the group or aggregation ID (and optionally the UE ID) at CAF 402 (step 608 of FIG. 6). CAF 402 may identify whether an aggregation closure condition has occurred (step 610 of FIG. 6). The aggregation closure condition may be a data volume limit, or a time or duration limit, as examples. If the aggregation closure condition has not been met at step 610 ("No" at step 610 of FIG. 6), then the process ends at an end block 614 without generation of a CDR.

Subsequently, additional chargeable events may occur for UEs associated with the same or different group or aggregation ID. That is, additional generation of requests 650 and storing 608 of chargeable events for UEs associated with the same or different group or aggregation ID will occur. When the aggregation closure condition has been met for a group or aggregation ID at step 610, CAF 402 may aggregate all of the chargeable events associated with the group or aggregation ID (i.e. those that have not yet been previously aggregated or accounted for) (step 612 of FIG. 6). Note that, as part of the aggregation rules, an individual IMSI PDN termination or abnormal release will not cause an aggregate CDR to be generated. Then, CDF 312 may generate an aggregate CDR 652 corresponding to the aggregated chargeable events associated with the group or aggregation ID. CGF 314 may receive the aggregate CDR 652 and forward it to the BD 152 for processing (e.g. generating a billing document associated with the aggregation ID).

FIG. 7 is a process flow diagram 700 for describing a method for use in generating CDRs for data communications associated with groups or aggregates of UEs, such as IoT devices, operating in mobile or wireless networks. The method described in relation to FIG. 7 may incorporate any of the associated steps or elements described in relation to the previous figures. Again, a group or aggregate of UEs may be associated with a (unique) group or aggregation ID; the group or aggregation ID may be associated with a list of UE IDs (e.g. IMSIs) corresponding to the UEs in the group or aggregate.

In the process flow diagram 700 of FIG. 7, UE 102 and CPCN 302 which includes CTF 310, CDF 312, and CGF 314 are indicated. To begin, UE 102 may send a message which includes a request for content or service to be delivered via a mobile network (step 1 of FIG. 7). In response, the mobile network may deliver the requested content or service to the UE 102 (step 2 of FIG. 7). After delivery of the content or service to the UE 102, CTF 310 may generate charging data associated with the content or service delivery (step 3 of FIG. 7), and send a charging data request associated with the generated charging data to the CDF 312 or CAF 402 (step 4 of FIG. 7). In response to receipt of the request, CAF 402 may process the request (step 5 of FIG. 7), which may include storing the charging data in association with the group or aggregation ID associated with the UE 102. CAF 402 may send a message which includes a charging data response (step 6 of FIG. 7). Steps 1 through 6 may repeat a number of times for UEs of the same or different group or aggregate.

In response to identifying an aggregation closure condition (e.g. a data volume limit or a time/duration limit has been reached), CAF 402 may perform a charging data aggregation process. In the charging data aggregation process, CAF 402 may aggregate the multiple, stored chargeable events associated with the same group or aggregation ID (steps 7, 8 and 9 of FIG. 7), until the aggregation is complete (taking into account those chargeable events that have not yet been previously aggregated). When the aggregation is complete at step 8, CAF 402 may send or provide to CDF 312 a charging data record generation request which includes the aggregated chargeable event data (step 10 of FIG. 7). CDF 312 may receive or obtain the request including the aggregated chargeable event data and, in response, process the request for generating an aggregate CDR based on the aggregated chargeable event data (step 11 of FIG. 7). CDF 312 may send back or provide to CAF 402 a charging data record generation response (step 12 of FIG. 7). CDF 312 may send a CDR delivery request to CGF 314, for forwarding the generated aggregate CDR to the billing domain "BD" (step 13 of FIG. 7). In response, CDF 312 may receive a CDR delivery response from CGF 314 (step 14 of FIG. 7).

The above-described examples of closure conditions include a data volume limit and a time/duration limit. Additional or alternative closure conditions may be preferred or included, such as a maximum number of NIDD submissions; an MME change; a serving PLMN rate control change for all devices in the aggregation identity; an Aggregation-Id or Group-Id based APN rate control change; a PLMN change; and/or a management intervention.

FIG. 8 is an illustrative representation of the communication system which includes the mobile network as described in FIG. 1, incorporating the functions and techniques as described in relation to FIGS. 4A-4C, 5, 6 and 7. As shown in FIG. 8, elements of the CPCN (the CTF, CAF, CDF, and/or CGF) may be incorporated in any one or more network functions of the mobile network, including SCEF 120, MME 114, and PGW 118.

In FIG. 8, AS 104 may send to BSS/OSS 150 a message which includes a request for subscription or service for a group or aggregate of UEs which are owned, operated, and/or managed by an enterprise of AS 104 (step 0 of FIG. 8). The subscription or service may be or include a subscription or service for data transfers between an AS (e.g. AS 104) and the group or aggregate of UEs. This request may include, implicitly or explicitly, a request for aggregated billing for the group or aggregate of UEs. The request may further include, for example, an external ID associated with the request, an application ID associated with an application of AS 104 (e.g. the application involving in the data transfers), and a list of UE IDs (e.g. IMSIs) corresponding to the UEs in the group or aggregate. The external ID may be used in the generation of the group or aggregation ID (e.g. the group or aggregation ID may encompass or include some or all of the external ID).

In response to receiving the request, BSS/OSS 150 may perform a provisioning procedure in mobile network 110 (step 1 in FIG. 8). As indicated in FIG. 8, provisioning may be performed in relation to HSS 112, BD 152, and any one or more of the pertinent network functions including SCEF 120, MME 114, and/or PGW 118. In particular, BSS/OSS 150 may send one or more messages which include a request for provisioning the group or aggregate of UEs to each one of HSS 112, BD 152, and pertinent network functions (e.g. SCEF 120, MME 114, and PGW 118). The request may include, for example, a group or aggregation ID associated with the group or aggregate, and a list of UE IDs (e.g. IMSIs) identifying the UEs of the group or aggregate. For BD 152, the request may further include an application ID associated with the application of AS 104.

UEs 102 of the group or aggregate may operate to register or attach in mobile network 110 (step 2 of FIG. 8). At the time of attachment, the UE ID (e.g. IMSI) of the UE may be received by the pertinent network function(s) (e.g. MME 114 and/or SCEF 120). In response, HSS 112 may provide to the pertinent network function(s) an aggregation profile (step 3 of FIG. 8). The aggregation profile may include the group or aggregation ID associated with the group and the list of UE IDs (e.g. IMSIs) corresponding to the UEs in the group or aggregate. The aggregation profile may also include one or more aggregation thresholds, which may be for use in the detection of one or more CDR closure conditions (e.g. the aggregation threshold may be a data volume limit, or a time or duration limit, etc.).

A plurality of network resource usage events associated with the UEs 102 of the group or aggregate may occur. The network resource usage events may be or include data transfers or communications between AS 104 and the UE 102. Event data for a given UE of the group or aggregate may be stored in association with the group or aggregation ID. The event data may be chargeable event data. In response to the detection of one or more closure conditions (e.g. a data volume limit, or a time or duration limit), the event data for the entire group or aggregate may then be aggregated. An aggregate CDR may be generated based on the aggregated chargeable event data and delivered to BD 152 (step 4 of FIG. 8). BD 152 may receive the aggregate CDR for processing (e.g. generating a billing document associated with the aggregation ID). Subsequently, BD 152 may send to AS 104 a message including an aggregated billing based on one or more of such aggregated CDRs (step 5 of FIG. 8).

FIGS. 9A-9E are illustrative representations of architecture implementations options 900 associated with a CPCN (e.g. CPCN 302 of FIGS. 4A-4C, 5A-5B, 6, 7, and 8). In the architecture implementation option of FIG. 9A, CPCN 302 includes CTF 310, CDF 312 having CAF 402, and CGF 314, where CGF 314 and BD 152 communicate via the Bcp interface 324. In the architecture implementation option of FIG. 9B, CPCN 302 includes CTF 310 and CDF 312 having CAF 402, but CGF 314 is included at a node that is separate and apart from CPCN 302; here, CDF 312 and CGF 314 communicate via the Ga interface 322, and CGF 314 and BD 152 communicate via the Bcp interface 324. In the architecture implementation option of FIG. 9C, CPCN 302 includes CTF 310 and CDF 312 having CAF 402, but CGF 314 is included at the BD 152; here, CDF 314 and the CGF 314 at the BD 152 communicate via the Ga interface 322. In the architecture implementation option of FIG. 9D, CPCN 302 includes CTF 310, but CDF 312 having CAF 402 is included at a node that is separate and apart from CPCN 302, and CGF 314 is included at the BD 152; here, CTF 310 and CDF 312 communicate via the Rf interface 320, and CDF 314 and CGF 314 at the BD 152 communicate via the Ga interface 322. In the architecture implementation option of FIG. 9E, CPCN 302 includes CTF 310, but CDF 312 having CAF 402 is included at a node that is separate and apart from CPCN 302, and CGF 314 is included at a node that is separate and apart from CPCN 302; CTF 310 and CDF 312 communicate via the Rf interface 320, CDF 312 and CGF 314 communicate the Ga interface 322, and CGF 314 and BD 152 communicate via the Bcp interface 324.

One or more advantages associated with the process-efficient generation of data records for data communications of IoT devices may be realized. For example, a "smart city" IoT service may have 10 million devices across a city with variable usage and event profiles, as follows: (1) Trash Cans—100,000—2 events per day; (2) Parking Meters—10,000—48 events per day; (3) Traffic Lights—20,000—1 event per day; (4) Environmental Monitoring—24 events per day; and (5) Utility Meters—1,000,000—1 event per day. Given an average of 10 unique events per IoT device daily, and a scale of about 10 million IoT devices, for example, the expected number of CDRs generated per day would be 100 million (i.e. an undesirable, very large number). Assuming each CDR to be approximately 300 bytes, the billing domain entity would receive 10 million*10*300 bytes=30 GB/day CDRs (i.e. an undesirable, very large number). Additional storage would be required for CDR retention.

On the other hand, according to techniques of the present disclosure, given a diverse business use case, an enterprise may request a service provider to offer a tiered plan based on IoT device usage and use case segment. Billing may therefore be handled on a per-tiered plan for a group of IoT devices having similar charging and invoicing policies. Here, in contrast to the above, the number of CDRs may be reduced down to a few 100 CDRs per day, for example, based on unique use cases for LPWA deployments per enterprise.

Alternative implementations of the present disclosure are now described in relation to FIGS. 10-15, for generating a data record for a group data transfer between an AS and a group of UEs.

Figure 10:
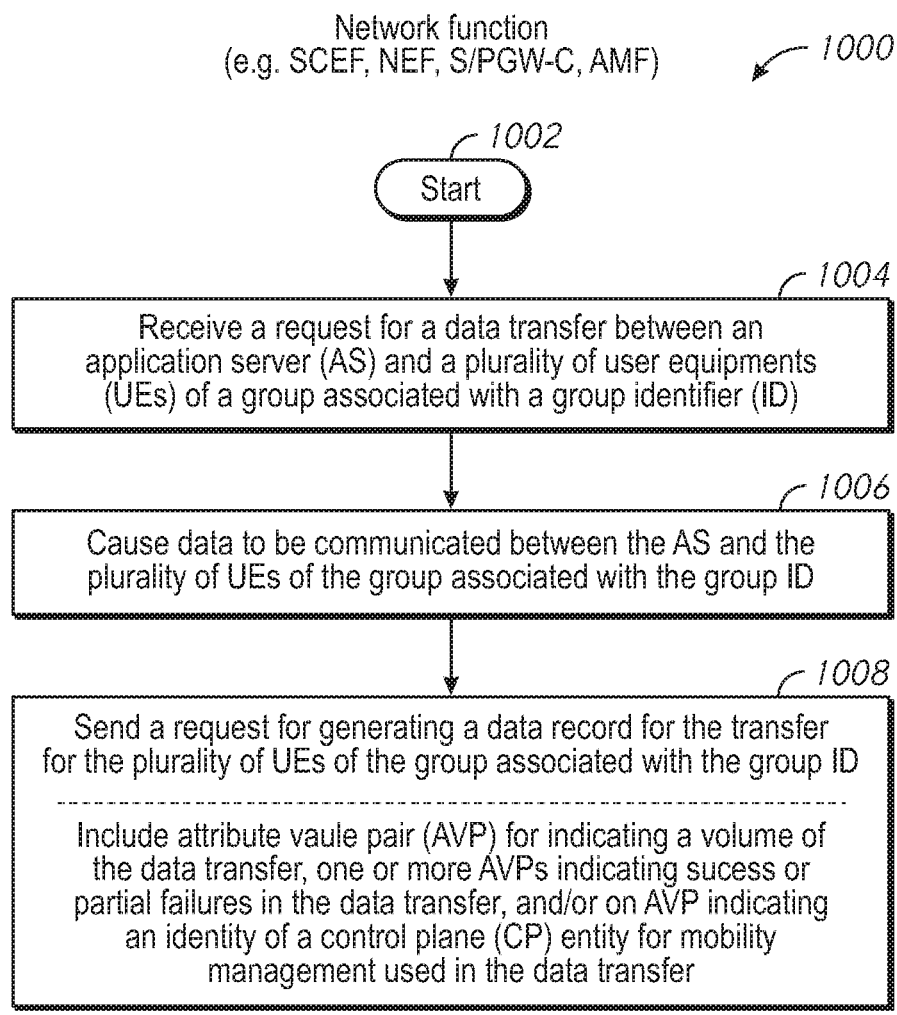
FIG. 10 is a flowchart for describing a method for use in generating data records for data communications associated with groups or aggregates of UEs, such as IoT devices, operating in mobile or wireless networks.

FIG. 10 is a flowchart 1000 for describing a method for use in generating data records (e.g. CDRs) for data communications associated with groups of UEs, such as IoT devices, operating in mobile or wireless networks. The methods may be embodied in and/or performed by one or more network nodes or functions in a mobile network. For example, a network function (NF) configured to implement the method of FIG. 10 may be an SCEF (or NEF in 5G) or a S/PGW-C (or AMF in 5G). A network node may be a server, a network element, a network device, or network equipment in the mobile network. The methods may be further embodied as one or more computer program products each including a non-transitory computer readable medium and instructions stored in the computer readable medium where the instructions are executable on one or more processors of the one or more network nodes for performing the steps of the method.

Beginning at a start block 1002 of FIG. 10, a message which includes a request for a data transfer between an AS and a plurality of user equipments (UEs) of a group associated with a group identifier (ID) may be received (step 1004 of FIG. 10). In response to the request for the data transfer, data may be communicated between the AS and the plurality of UEs of the group associated with the group ID (step 1006 of FIG. 10). In some implementations, the request for the data transfer is received from the AS and includes the group ID and the data to be delivered, and the data transfer is performed as a series of unicast data deliveries to the UEs of the group associated with the group ID. The request for generating a data record associated with the data transfer for the group of UEs may be sent (step 1008 of FIG. 10). The request for generating a data record may be a charging data record generation request for generating a CDR, where the CDR is associated with and/or includes the group ID.

In some implementations, the request of FIG. 10 may include an attribute value pair (AVP) indicating a volume of the data transfer for the plurality of UEs of the group associated with the group ID. Additionally, or alternatively, the request may include an AVP indicating an identity of a control plane (CP) entity for mobility management used in the data transfer for the plurality of UEs of the group associated with the group ID. Further additionally or alternatively, the request may include one or AVPs indicating success or partial failures in the data transfer for the plurality of UEs of the group associated with the group ID.

Figure 11:
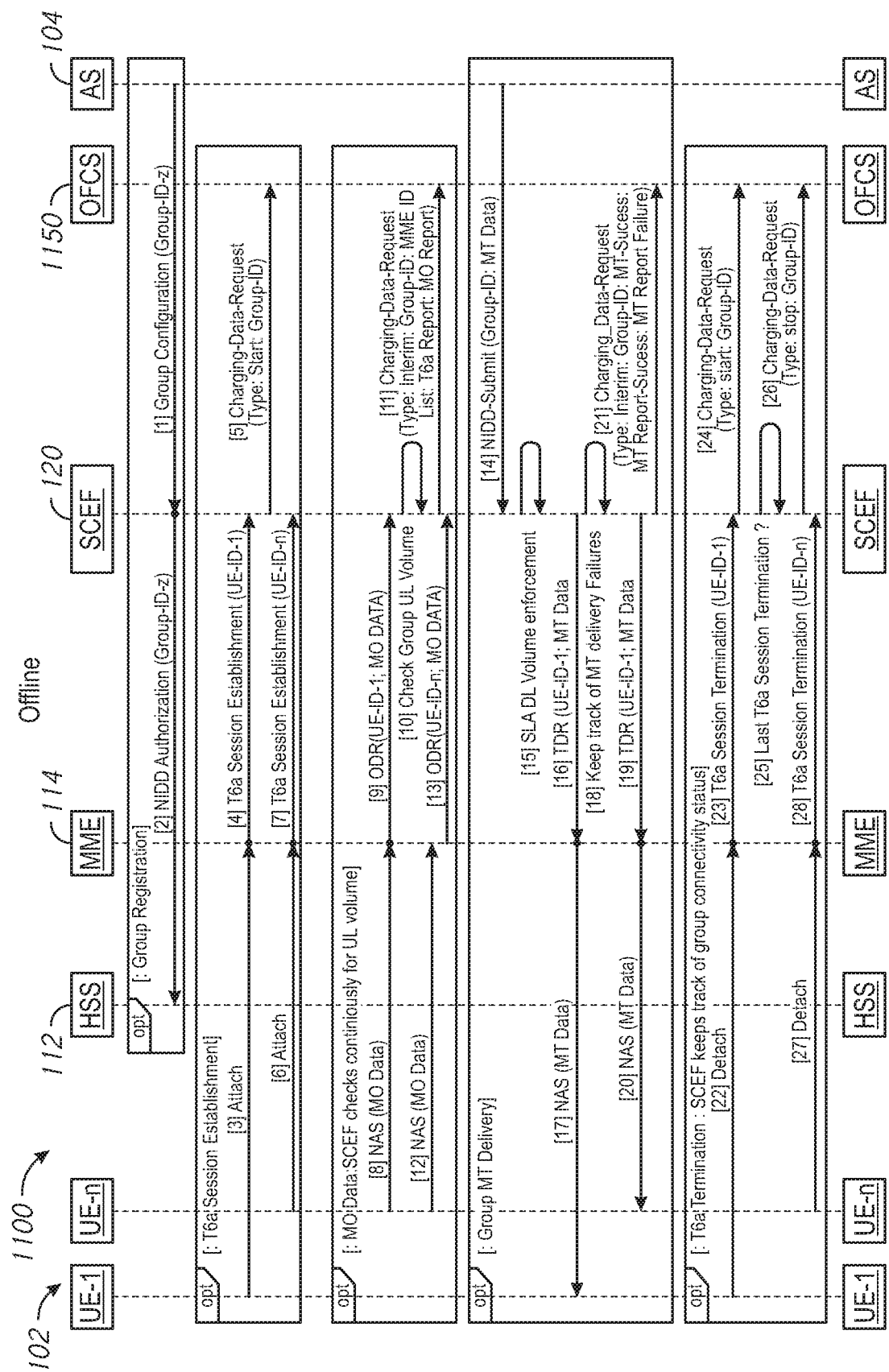
FIG. 11 is a process flow diagram for describing a method for use in generating CDRs for data communications associated with groups or aggregates of UEs, such as IoT devices, operating in mobile or wireless networks, for use with an offline charging system (OFCS)

With respect to an offline charging system (OFCS), a process flow diagram 1100 of FIG. 11 is shown for describing a method for use in generating data records (e.g. CDRs) for data communications associated with groups of UEs, such as IoT devices, operating in mobile or wireless networks. The method of FIG. 11 may be a specific implementation of that previously described in relation to FIG. 10. The method may be performed for data transfers involving non-IP data delivery (NIDD) for IoT devices (e.g. NB IoT and/or CAT-M1 devices), and in association with an offline charging system (OFCS) 1150 of the mobile or wireless network and is for non-IP data delivery (NIDD) for IoT devices.

To begin in FIG. 11, AS 104 may send a request for group configuration to SCEF 120 (step 1 of FIG. 11). The request may include a group ID associated with a group of UEs and a list of UE IDs (e.g. IMSIs) corresponding to the UEs in the group. In response, SCEF 120 may perform a group registration for the group, with HSS 112 and/or MME 114. Here SCEF 120 may submit an NIDD authorization request for authorization of the group (step 2 of FIG. 11).

UEs of the group may begin to register/attach to the mobile network. For example, a UE-1 may attach to the mobile network, connecting with MME 114 (step 3 of FIG. 11). In response, MME 114 may send a T6a session establishment request to SCEF 120 (step 4 of FIG. 11). In response, SCEF 120 may send a charging data request to the OFCS 1150, as it is the first UE of the group to attach (step 5 of FIG. 11). The request may include the group ID of the group of UEs and a request type indicative of "start". Similarly, a UE-n may attach to the mobile network, connecting with MME 114 (step 6 of FIG. 11). In response, MME 114 may send a T6a session establishment request to SCEF 120 (step 7 of FIG. 11). Steps 6 and 7 will repeat for additional attachments of UEs in the group.

For mobile-originated (MO) data delivery, one of the UEs 102 (e.g. UE-1) may send to MME 114 a non-access stratum (NAS) message which includes MO data for delivery to AS 104 (step 8 of FIG. 11). In response, MME 114 may send to SCEF 120 a MO data request (ODR) (step 9 of FIG. 11). The ODR may include a UE ID of the UE and the MO data. SCEF 120 may check that a data volume limit for the group (e.g. a group uplink volume) would not be exceeded (step 10 of FIG. 11). The SCEF 120 may also send a charging data request to the OFCS 1150 (step 11 of FIG. 11). The charging data request may include the group ID associated with the UE, a request type indicative of "interim" a list of one or more MME IDs associated with the data delivery, and a MO report. Additional UEs may have MO data for delivery in the same or similar manner; for example, a UE-n may send to MME 114 a NAS message which includes MO data for delivery to AS 104 (step 12 of FIG. 11). In response, MME 114 may send to SCEF 120 a MO data request or ODR (step 13 of FIG. 11).

For mobile-terminated (MT) data delivery, AS 104 may send to SCEF 120 a request for MT data delivery to the group of UEs (step 14 of FIG. 11). The request may be an NIDD submit request which includes the group ID associated with the group and the MT data for delivery. In response, SCEF 120 may check that a data volume limit for the group (e.g. a group downlink volume) would not be exceeded (step 15 of FIG. 11). If the limit would not be exceeded, SCEF 120 may send the MT data for delivery to the UEs of the group. Here, the MT data delivery between SCEF/MME and the UEs may be performed on a UE-by-UE basis. More specifically, SCEF 120 may send to MME 114 an MT data request (TDR) for MT data delivery to one of the UEs in the group (e.g. UE-1) (step 16 of FIG. 11). The TDR may include a UE ID of the UE-1 and the MT data for delivery. In response, MME 114 may send to the UE-1 a NAS message which includes the MT data (step 17 of FIG. 11). Note that SCEF 120 may keep track and record MT data delivery failures and/or successes (step 18 of FIG. 11). Similarly, SCEF 120 may send to MME 114 another MT data request (TDR) for MT data delivery to another one of the UEs in the group (e.g. UE-n) (step 19 of FIG. 11). Again, the TDR may include a UE ID of UE-n in the group (e.g. UE-1) and the MT data for delivery. In response, MME 114 may send to the UE-n a NAS message which includes the MT data (step 20 of FIG. 11). Steps 19 and 20 will repeat for additional deliveries to UEs in the group. When the MT data delivery to the group of UEs has been completed, SCEF 120 may send a charging data request to the OFCS 1150 (step 21 of FIG. 11). The charging data request may include the group ID associated with the UE, a request type indicative of "interim," and a MO report of success(es) and/or failure(s). A CDR may be generated for the data delivery to the group of UEs in response to the charging data request.

UEs of the group may begin to detach from the mobile network. For example, a UE-1 may detach from the mobile network, disconnecting with MME 114 (step 22 of FIG. 11). In response, MME 114 may send a T6a session termination request to SCEF 120 (step 23 of FIG. 11). In response, SCEF 120 may send a charging data request to the OFCS 1150, indicating the detachment (step 24 of FIG. 11). The request may include the group ID of the group of UEs and a request type indicative of "start". Note that SCEF 120 may check whether the detachment is from the last one of the UEs in the group (step 25 of FIG. 11). If so, SCEF 120 may send a charging data request to the OFCS 1150, indicating the detachment (step 26 of FIG. 11), which may include the group ID of the group of UEs and a request type indicative of "stop". Similarly, may detach from the mobile network, disconnecting with MME 114 (step 27 of FIG. 11). In response, MME 114 may send a T6a session termination request to SCEF 120 (step 28 of FIG. 11). Steps 27 and 28 will repeat for additional detachments of UEs in the group.

In a charging data request (e.g. having a "Start", "Stop", or "Interim" indication as understood by those skilled in the art), a CTF requests a CDF to store event related charging data for CDR generation purposes. Here, the charging data request in the technique of FIG. 11 may include one or more additional AVPs related to group processing. Referring ahead to FIG. 13, a table 1300 for listing a service-information AVP of a charging data request is shown. In table 1300 of FIG. 13, a first column 1302 indicates an information element (IE), a second column 1304 indicates a category of the IE, and a third column 1306 indicates a description of the IE. Notably, the service-information AVP of FIG. 13 includes a group identifier (ID) and a group APN rate control which may be enforced in the SCEF for the record.

In FIG. 14, what is shown is a table 1400 for listing a control plane data transfer (CPDT) AVP of the service-information AVP of FIG. 13 (i.e. the last IE in table 1300 of FIG. 13). In table 1400 of FIG. 14, a first column 1402 indicates the CPDT AVP, a second column 1404 indicates a category, and a third column 1406 indicates a description of the CPDT AVP. Relatedly in FIG. 15, a table 1500 for defining or describing CPDT AVPs for use with groups of UEs and associated with FIG. 14 is shown. In table 1500 of FIG. 15, a first column 1502 indicates an AVP name, a second column 1504 indicates the AVP, and a third column 1506 indicates a description of the AVP. New, additional AVPs as indicated in FIGS. 14-15 include a group identifier (ID); an MME ID list; a group data volume for uplink data transfers; a group data volume for downlink data transfers; a group T6a report; a group MO report; a group MT report-success; a group MT report-partial delivery; and a group result code.

Figure 12:
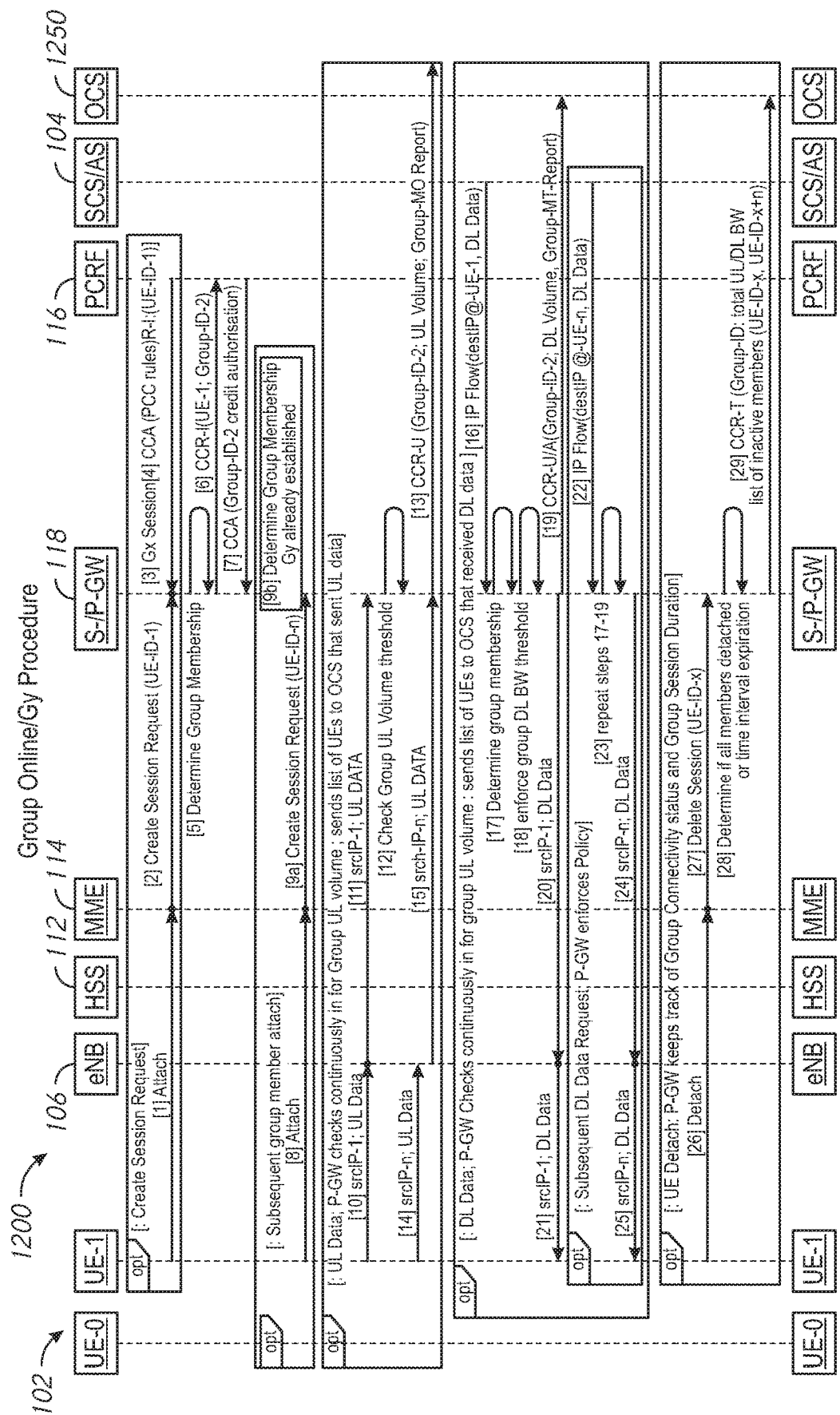
FIG. 12 is a process flow diagram for describing a method for use in generating CDRs for data communications associated with groups or aggregates of UEs, such as IoT devices, operating in mobile or wireless networks, for use with an online charging system (OCS)

With respect to an online charging system (OCS), a process flow diagram 1200 of FIG. 12 is shown for describing a method for use in generating CDRs for data communications associated with groups of UEs, such as IoT devices, operating in mobile or wireless networks. The group of UEs may be associated with a (unique) group or aggregation ID; the group ID may be associated with a list of UE IDs (e.g. IMSIs) corresponding to the UEs in the group. The method of FIG. 12 may be a specific implementation of that previously described in relation to FIG. 10. The method may be performed for data transfers involving IP data delivery for IoT devices (e.g. CAT-M1 devices), and in association with an online charging system (OCS) 1250 of the mobile or wireless network.

To begin in FIG. 12, a first or initial one of the UEs in the group (e.g. UE-1 of FIG. 12) may operate to register or attach in mobile network 110 (step 1 of FIG. 12). At the time of attachment, the UE ID (e.g. IMSI) of the UE may be received by MME 114. In response, MME 114 may send to S/PGW 118 a message which includes a create session request which includes the UE ID (step 2 of FIG. 12). In response, S/PGW 118 may establish a Gx session with PCRF 116 (step 3 of FIG. 12). PCRF 116 may send to S/PGW 118 a message which includes a credit check answer (CCA) having one or more PCC rules for installation at the S/PGW 118 (step 4 of FIG. 12). The one or more PCC rules may be used for policy enforcement at S/PGW 118 for the individual UE. S/PGW 118 may determine and/or associate the group ID of the UE (step 5 of FIG. 12). S/PGW 118 may send to the OCS 1250 a message which includes a credit check request (CCR) (step 6 of FIG. 12). This request may include the UE ID and the determined group ID. In response, OCS 1250 may send back to S/PGW 118 a message which includes a credit check answer (CCA) (step 7 of FIG. 12). The CCA may provide a credit authorization for the group over the Gy interface.

Next, a subsequent one of the UEs in the group (e.g. UE-n of FIG. 12) may operate to register or attach in mobile network 110 (step 8 of FIG. 12). At the time of attachment, the UE ID (e.g. IMSI) of the UE may be received by MME 114. In response, MME 114 may send to S/PGW 118 a message which includes a create session request which includes the UE ID (step 9a of FIG. 12). S/PGW 118 may determine and/or associate the group ID of the UE (step 9b of FIG. 12). As credit authorization has already been received in step 7, no further credit authorization need be obtained. Steps 8-9 may be repeated for each of one or more additional UEs in the group.

For uplink (UL) IP data delivery, one of the UEs 102 (e.g. UE-1) may send UL IP data to eNB 106 (step 10 of FIG. 12) which forwards the data to S/PGW 118 (step 11 of FIG. 12). S/PGW 118 may check that an UL data volume limit for the group (e.g. a group UL volume) would not be exceeded by the UL data delivery (step 12 of FIG. 12). S/PGW 118 may send to the OCS 1250 a message which includes a CCR (step 12 of FIG. 12). This request may include the group ID, the UL data volume, and the MO report (step 13 of FIG. 12). Additional UEs may have UL data for delivery in the same or similar manner; for example, a UE-n may send via eNB 106 UL data for delivery (step 14 of FIG. 12) and these data are forwarded to S/PGW 118 (step 15 of FIG. 12).

For downlink (DL) IP data delivery, AS 104 may send a request for IP data delivery to UEs 102 in the group (step 16 of FIG. 12). The request may include one or more UE IDs (e.g. one or more destination IP addresses) and the DL data for delivery. S/PGW 118 may determine or associate a group ID with the UE IDs (step 17 of FIG. 12). S/PGW 118 may check that an DL data volume limit for the group (e.g. a group DL volume) associated with the group ID would not be exceeded by the DL data delivery (step 18 of FIG. 12). S/PGW 118 may send to the OCS 1250 a message which includes a CCR (step 19 of FIG. 12). This request may include the group ID, the DL data volume, and the MT report. S/PGW 118 may send the DL data to eNB 106 (step 20 of FIG. 12) for delivery to the UEs 102 in the mobile network (step 21 of FIG. 12). Additional DL IP data deliveries to UEs 102 may occur in the same or similar manner; for example, AS 104 may send a request for IP data delivery to UEs 102 in the group (step 22 of FIG. 12), where steps 17-19 are repeated (step 23 of FIG. 12), and where S/PGW 118 sends the DL data to eNB 106 (step 24 of FIG. 12) for delivery to the UEs 102 in the mobile network (step 25 of FIG. 12).

Sometime during operation, one of the UEs in the group (e.g. UE-1 of FIG. 12) may operate detach from the mobile network, disconnecting from MME 114 (step 26 of FIG. 12). In response, MME 114 may send to S/PGW 118 a message which includes a delete session request which includes the UE ID (step 27 of FIG. 12). S/PGW 118 may determine if all members of the group have detached, or whether a time interval has expired (step 28 of FIG. 12). S/PGW 118 may send to the OCS 1250 a message which includes a CCR (step 19 of FIG. 12). This request may include the group ID, the total UP/DL bandwidth, and a list of inactive members of the group (e.g. the UE IDs or IP addresses thereof).

Thus, what have been described are methods, apparatus, and systems for use in the process-efficient generation of data records for data communications involving groups or aggregates of user equipments (UEs), such as Internet of Things (IoT) devices. In one illustrative example, for each one of a plurality of UEs associated with a group or aggregation identifier (ID), a request which includes data indicative of a network resource usage event of the UE is received and the data are stored in association with the group or aggregation ID. In response to identifying a predetermined condition, the data indicative of the network resource usage events associated with the group or aggregation ID are aggregated. A request for generating a data record based on the aggregated data is then sent to a data function for generating a data record. The generated data record may be stored for subsequent retrieval, for reporting, analysis, billing, and/or communications management. The predetermined condition may be or include, as examples, an expiration of a time period, or a detection of a volume limit for data transfers involving the plurality of UEs. The technique may be performed by one or more network nodes or functions of a mobile network. For example, the one or more network nodes or functions comprise a charging data function (CDF) which includes an aggregation function, where the request including the data indicative of the network resource usage event is a charging data request from a charging trigger function (CTF), and the request for generating a data record is a request for generating a charging data record (CDR). The CDR may sent via a charging gateway function (CGF) for receipt at a billing domain entity.

A system of the present disclosure may include one or more network nodes of a control plane (CP) entity for data transfer charging (e.g. a control plane data transfer charging node or "CPCN"). The one or more network nodes may have a CTF and a CDF which may include an aggregation function. The CTF may be configured to, for each one of a plurality of UEs associated with a group or aggregation ID, send to the CDF (or the aggregation function thereof) a charging data request which includes charging data indicative of a charging event of the UE. The CDF (or the aggregation function thereof) may be configured to, for each one of the plurality of UEs associated with the group or aggregation ID, receive from the CTF the request which includes the charging data indicative of the network resource usage event and store the charging data in association with the group or aggregation ID. The aggregation function may be configured to, in response to identifying a predetermined condition, aggregate the charging data indicative of the charging events associated with the group or aggregation ID, and provide to the CDF a charging data record generation request for generating a CDR based on the aggregated data. The CDR may sent via a CGF for receipt at a billing domain entity.

In at least some other implementations, a request for a data transfer between an AS and a plurality of UEs of a group associated with a group ID is received. In response to the request for the data transfer, data are communicated between the AS and the plurality of UEs of the group associated with the group ID. A request for generating a data record for the data transfer for the plurality of UEs of the group associated with the group ID is sent to a system for generating data records. The request for generating the data record may include, for example, an attribute value pair (AVP) indicating a volume of the data transfer for the plurality of UEs of the group, one or more AVPs indicating success or partial failures in the data transfer for the plurality of UEs of the group, and/or an AVP indicating an identity of a CP entity for mobility management used in the data transfer for the plurality of UEs of the group. The request for generating the data record may be a charging data request for generating a CDR, where the CDR is sent via a CGF for receipt at a billing domain entity.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first request could be termed a second request, and similarly, a second request could be termed a first request, without changing the meaning of the description, so long as all occurrences of the "first request" are renamed consistently and all occurrences of the "second request" are renamed consistently. The first request and the second request are both requests, but they are not the same request.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a charging data function for use in a mobile network,
        obtaining from a charging trigger function (CTF) a charging data request responsive to a network resource usage event of a user equipment (UE) and including data indicative of the network resource usage event of the UE;
        processing the charging data request by:
            based on the charging data request indicating that aggregation is not to be performed, generating a charging data record (CDR) for the UE based on the data indicative of the network resource usage event of the UE;
            based on the charging data request indicating that aggregation is to be performed, storing the data indicative of the network resource usage event of the UE in association with a group or aggregation identifier (ID) which identifies a group or aggregate of UEs;
        repeating the obtaining and the processing for each one of a plurality of charging data requests associated with a plurality of network resource usage events of a plurality of UEs;
        in response to identifying a predetermined condition:
            aggregating, by an aggregation function of the charging data function, each stored data indicative of the network resource usage event associated with the group or aggregation ID, for producing aggregated data for the group or aggregate of UEs; and
            generating, based on the aggregated data, an aggregate CDR for the group or aggregate of UEs.

2. The method of claim 1, wherein:
    obtaining the charging data request comprises obtaining the charging data request at the aggregation function of the charging data function.

3. The method of claim 1, wherein each charging data request indicating that aggregation is to be performed includes the group or aggregation ID which identifies the group or aggregate of UEs.

4. The method of claim 1, wherein identifying the predetermined condition comprises identifying an expiration of a time period.

5. The method of claim 1, wherein identifying the predetermined condition comprises identifying a volume limit for data transfers involving the group or aggregate of UEs.

6. The method of claim 1, wherein:
    generating the aggregate CDR comprises including the group or aggregation ID in the aggregate CDR.

7. The method of claim 1, wherein:
each charging data request indicating that aggregation is to be performed includes the data indicative of the network resource usage event of the UE for a data transfer between an application server (AS) and the UE in the group or aggregate of UEs, and
the CTF is associated with a network function configured for exposure of services and capabilities of the mobile network, and for interfacing with the AS for data transfers of the group or aggregate of UEs via the mobile network.

8. The method of claim 1, wherein the aggregate CDR is stored for subsequent retrieval for reporting, analysis, billing, or communications management.

9. The method of claim 1, further comprising:
at the charging data function, sending the aggregate CDR via a charging gateway function (CGF) for receipt at a billing domain entity.

10. A computer program product comprising:
a non-transitory computer readable medium;
instructions stored in the non-transitory computer readable medium, the instructions comprising a charging data function executable on one or more processors of a network node in a mobile network for:
obtaining from a charging trigger function (CTF) a charging data request responsive to a network resource usage event of a user equipment (UE) and including data indicative of the network resource usage event of the UE;
processing the charging data request by:
based on the charging data request indicating that aggregation is not to be performed, generating a charging data record (CDR) for the UE based on the data indicative of the network resource usage event of the UE;
based on the charging data request indicating that aggregation is to be performed, storing the data indicative of the network resource usage event of the UE in association with a group or aggregation identifier (ID) which identifies a group or aggregate of UEs;
repeating the obtaining and the processing for each one of a plurality of charging data requests associated with a plurality of network resource usage events of a plurality of UEs;
in response to identifying a predetermined condition:
aggregating, by an aggregation function of the charging data function, each stored data indicative of the network resource usage event associated with the group or aggregation ID which identifies the group or aggregate of UEs, for producing aggregated data for the group or aggregate of UEs; and
generating, based on the aggregated data, an aggregate CDR for the group or aggregate of UEs.

11. The computer program product of claim 10, wherein each charging data request indicating that aggregation is to be performed includes the data indicative of the network resource usage event of the UE for a data transfer between an application server (AS) and the UE in the group or aggregate of UEs.

12. The computer program product of claim 10, wherein the instructions of the charging data function are executable on the one or more processors further for:
identifying the predetermined condition by identifying an expiration of a time period or by identifying a volume limit for data transfers involving the group or aggregate of UEs.

13. The computer program product of claim 10, wherein the instructions of the charging data function are executable on the one or more processors further for:
for each charging data request, identifying an aggregation indicator in the charging data request, and
wherein the aggregation indicator is set to indicate that aggregation is to be performed or that aggregation is not to be performed.

14. The computer program product of claim 10, wherein the instructions of the charging data function are executable on the one or more processors further for:
sending the aggregate CDR via a charging gateway function (CGF) for receipt at a billing domain entity.

15. A network node for use in a mobile network, the network node comprising:
one or more processors;
an interface for communication with a billing domain (BD) entity via a charging gateway function (CGF);
the one or more processors being configured for executing a charging data function for:
obtaining from a charging trigger function (CTF) a charging data request responsive to a network resource usage event of a user equipment (UE) and including data indicative of a network resource usage event of the UE;
processing the charging data request by:
based on the charging data request indicating that aggregation is not to be performed, generating a charging data record (CDR) based on the data indicative of the network resource usage event of the UE and sending the CDR via the CGF to the BD entity;
based on the charging data request indicating that aggregation is to be performed, storing the data indicative of the network resource usage event of the UE in association with a group or aggregation identifier (ID) which identifies a group or aggregate of UEs;
in response to identifying a predetermined condition:
aggregating, by an aggregation function of the charging data function, each stored data indicative of the network resource usage event associated with the group or aggregation ID which identifies the group or aggregate of UEs, for producing aggregated data for the group or aggregate of UEs; and
generating, based on the aggregated data, an aggregate CDR for the group or aggregate of UEs and sending the aggregate CDR via the CGF to the BD entity.

16. The network node of claim 15, wherein the one or more processors are configured for executing the charging data function further for:
generating the aggregate CDR by including the group or aggregation ID in the aggregate CDR.

17. The network node of claim 15, wherein the one or more processors are configured for executing the charging data function further for:
identifying the predetermined condition by identifying an expiration of a time period or by identifying a volume limit for data transfers involving of the group or aggregate of UEs.

18. The network node of claim 15, wherein the one or more processors are configured for executing the charging data function further for:
charging data request, identifying an aggregation indicator in the charging data request, and wherein the aggregation indicator is set to indicate that aggregation is to be performed or that aggregation is not to be performed.

19. The network node of claim 15, wherein:

the one or more processors are further configured for further executing a network function comprising one of a services and capabilities exposure function (SCEF) or a network exposure function (NEF), for interfacing with an application server for a data transfer involving the group or aggregate of UEs, each charging data request indicating that aggregation is to be performed includes the data indicative of the network resource usage event of the UE for the data transfer between the application server and the UE in the group or aggregate of UEs, and the data transfer involves the group or aggregate of UEs which include lightweight machine-to-machine (LWM2M) devices and/or Internet of Things (IoT) devices.

20. The network node of claim 15, wherein the one or more processors are further configured for further executing one of a control plane (CP) function for mobility management, a CP function for exposure of services and capabilities, or a CP function for session management.

\* \* \* \* \*